United States Patent
Terada et al.

(10) Patent No.: US 8,170,385 B2
(45) Date of Patent: May 1, 2012

(54) LIGHT COUPLER AND MANUFACTURING METHOD THEREOF

(75) Inventors: Kazuhiro Terada, Aichi-ken (JP); Kenji Haga, Aichi-ken (JP); Yukitoshi Inui, Aichi-ken (JP); Akiko Okita, Aichi-ken (JP); Masaaki Tsuchimori, Owariasahi (JP); Akari Nakao, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 398 days.

(21) Appl. No.: 12/379,285

(22) Filed: Feb. 18, 2009

(65) Prior Publication Data

US 2009/0196552 A1 Aug. 6, 2009

(30) Foreign Application Priority Data

Feb. 19, 2008 (JP) ................ 2008-037956
Feb. 19, 2008 (JP) ................ 2008-037967
Jun. 26, 2008 (JP) ................ 2008-167252

(51) Int. Cl.
  *G02B 6/125* (2006.01)
  *G02B 6/122* (2006.01)
  *G02B 6/12* (2006.01)
  *G02B 6/26* (2006.01)

(52) U.S. Cl. ............... 385/47; 385/14; 385/31; 385/32; 385/39; 385/11

(58) Field of Classification Search ............ 385/47
See application file for complete search history.

(56) References Cited

U.S. PATENT DOCUMENTS

| | | | |
|---|---|---|---|
| 4,073,572 A | | 2/1978 | Avicola |
| 4,306,765 A * | | 12/1981 | Winzer et al. ............ 385/47 |
| 4,707,057 A * | | 11/1987 | Takahashi et al. ........ 385/19 |
| 5,165,080 A * | | 11/1992 | Healey .................... 359/636 |
| 5,381,250 A * | | 1/1995 | Meadows ................. 349/196 |
| 5,438,640 A | | 8/1995 | Sasaoka et al. |
| 6,490,382 B1 * | | 12/2002 | Hill ........................... 385/17 |
| 6,493,488 B1 * | | 12/2002 | Islam et al. ............... 385/47 |
| 6,748,132 B1 * | | 6/2004 | Kapany et al. ............ 385/24 |
| 6,925,233 B2 * | | 8/2005 | Inui et al. ................. 385/39 |

(Continued)

FOREIGN PATENT DOCUMENTS

CN  1103719 A  6/1995

(Continued)

OTHER PUBLICATIONS

Fuji Xerox Co., Ltd., Technical Report, 1996, No. 1 (http://www.fujixerox.co.jp/company/tr/tr96/Takshi_Ota/T_Ota101.html).

(Continued)

*Primary Examiner* — Michelle R Connelly

(74) *Attorney, Agent, or Firm* — McGinn IP Law Group, PLLC

(57) ABSTRACT

The present invention provides a light coupler and a manufacturing method thereof. The light coupler of the invention includes a plurality of light input terminals, a plurality of light output terminals, a plurality of half mirrors, and an optical wave guide connecting the plurality of the light input terminals, the plurality of the light output terminals and the plurality of the half mirrors. The optical wave guide has kinked line shape and each of the plurality of half mirrors is placed at a respective corner of the kinked line shape. Especially, the kinked line shape includes a polygon network.

32 Claims, 15 Drawing Sheets

U.S. PATENT DOCUMENTS

| | | |
|---|---|---|
| 6,932,880 B2 | 8/2005 | Inui et al. |
| 7,136,588 B1 * | 11/2006 | Islam et al. .................... 398/83 |
| 7,166,322 B2 | 1/2007 | Inui et al. |
| 7,263,250 B1 | 8/2007 | Wang et al. |
| 2002/0114601 A1 | 8/2002 | Kagami et al. |
| 2002/0154845 A1 * | 10/2002 | Xie et al. ........................ 385/11 |
| 2002/0186935 A1 | 12/2002 | Inui et al. |
| 2006/0127009 A1 * | 6/2006 | Rasras et al. ................... 385/47 |
| 2007/0104426 A1 * | 5/2007 | Yun et al. ....................... 385/88 |
| 2009/0067786 A1 * | 3/2009 | Ohtsu et al. .................... 385/47 |
| 2009/0274415 A1 * | 11/2009 | Graham et al. ................. 385/18 |

FOREIGN PATENT DOCUMENTS

| | | |
|---|---|---|
| JP | 59-116924 | 8/1984 |
| JP | 59177517 A * | 10/1984 |
| JP | 2-177481 (A) | 7/1990 |
| JP | 5-027136 (A) | 2/1993 |
| JP | 9-243841 (A) | 9/1997 |
| JP | 2001-154046 | 6/2001 |
| JP | 2002-202427 (A) | 7/2002 |
| JP | 2002-365459 | 12/2002 |
| JP | 2002-365459 (A) | 12/2002 |
| JP | 2003-57476 (A) | 2/2003 |
| JP | 2004-149579 | 5/2004 |
| JP | 2005-62364 (A) | 3/2005 |
| JP | 2005-347441 | 12/2005 |
| JP | 4011283 | 2/2009 |
| WO | WO 01/01188 A1 | 1/2001 |
| WO | WO 2007/129266 A2 | 11/2007 |

OTHER PUBLICATIONS

Chinese Office Action dated Jul. 5, 2010.

Chinese Office Action dated Jul. 5, 2010 with English language summary.

German Office Action dated Dec. 17, 2009 with English translation thereof.

Japanese Office Action Nov. 15, 2011 (with a partial English translation).

* cited by examiner

LIGHT COUPLER AND MANUFACTURING METHOD THEREOF

BACKGROUND OF THE INVENTION

The present invention relates to an optical coupler using optical communication. In the present invention, the optical coupler distributes a signal input from an arbitrary optical input terminal to all optical output terminals. The output from each optical output may have a different dissipation. When an optical input terminal and an optical output terminal serve as a pair, a signal input from the optical input terminal forming the pair may or may not be output to the optical output terminal forming the pair therewith. The optical input and output ends serving as the pair may include an optical input/output terminal as one integrated optical terminal.

There are many attempts to apply an optical communication technology to a LAN technology constructed in homes or transportation vehicles such as an automobile, electric train, aircraft, ship, etc. Here, an optical coupler is required to distribute and output a signal input from an arbitrary input end to all optical output terminals with a low dissipation amount. For example, the optical coupler is concisely described in a non-patent document of Fuji Xerox Co. Ltd, Technical Report, 1996, No. 1 (http://www.fujixerox.co.jp/company/tr/tr96/Takshi_Ota/T_Ota101.html).

On the other hand, the applicants of the present invention have developed and filed a plurality of self-forming optical waveguides using a photo-curable resin liquid. In these technologies, when curing light of the resin liquid is radiated from an optical fiber, etc., the concentration of light is generated by the curable resin and a core is formed on a long axis. These technologies are included in Patent Documents JP-4011283, JP-2002-365459, JP-2004-149579, JP-2005-347441, JP-2001-154046, etc.

As an optical coupler manufacturing method, a method based on the fusion of a glass fiber is widely known. However, a device for fusing the glass fiber is expensive. The manufacturing process is complex and time-consuming. As a result, an optical coupler by the glass fiber fusion is very expensive. In addition, the optical coupler by the glass fiber fusion is not easily connected to a plastic optical fiber (POF) used in a small-scale LAN.

The optical coupler using the plastic optical fiber (POF) is also known. However, this is only a plastic optical fiber (POF) bundle. Only a large optical coupler is known as a device forming an optical LAN. Its size is, for example, about 7 cm.

On the other hand, the inventors has completed a new optical coupler shown below as a result of active efforts to develop an optical coupler as an application of the self-forming optical waveguide shown in the above-mentioned patent documents. The optical coupler of the present invention is based on a new manufacturing method and, more particularly, can be easily manufactured by applying a method of manufacturing the self-forming optical waveguide.

SUMMARY OF THE INVENTION

The present invention is a new coupler having an axis-shaped optical waveguide core in which a half mirror or a mirror is set to a corner of the kinked line. Especially, the kinked line includes polygon network. In this case, the half mirror or the mirror is set to a branching point and a corner of the polygon. The optical coupler of the present invention distributes and outputs a signal input from an arbitrary optical input terminal to an arbitrary optical output terminal even when a dissipation amount is different. In this case, when the optical input terminal and the optical output terminal serve as a pair, the signal input from the optical input terminal forming the pair may or may not be output to the optical output terminal forming the pair therewith. The optical input and output ends serving as the pair may be an optical input/output terminal as one integrated optical terminal.

Here, for example, the half mirror is formed of a dielectric multilayer film to transmit a part of incident light, and reflect the other part. In this case, transmittance and reflectance are not limited to 50% respectively, but suitable transmittance and reflectance can be set at a predetermined wavelength. When a plurality of wavelengths or wavelength bands is set as signal light, it is preferred that any one of the transmittance and reflectance may not become 100% for at least a wavelength used as the signal light.

It is preferred that the mirror has substantially no transmission. Its transmittance does not need to be completely 0% at a predetermined wavelength and its reflectance does not need to be completely 100% at the wavelength.

In the optical coupler of the present invention, the number of optical elements such as a half mirror and/or a mirror does not need to necessarily match the number of corners of the kinked line or a polygon net work of an optical waveguide.

The axis-shaped optical waveguide core is easily formed by a technology of a self-forming optical waveguide using a photo-curable resin. In its method, a half mirror and a mirror are retained inside a proper housing and a liquefied photo-curable resin is filled inside the housing. Light of a wavelength to cure the photo-curable resin is radiated from each optical input terminal, each optical output terminal, and each input/output end. Then, the growth of the axis-shaped self-forming optical waveguide starts from each optical terminal radiating the light. Accordingly, a core is formed along an optical path. When the core is grown and united from a different direction, a side surface of a united portion has a smooth pillar shape by a so-called optical solder effect. Also, when the core grows to a reflection (bent) portion where the half mirror or the mirror is placed from two directions, a core of a large-diameter convex can be formed by the optical solder effect also in the reflection (bent) portion.

In the present invention, an optical coupler includes a plurality of light input terminals, a plurality of light output terminals, a plurality of half mirrors, and an optical wave guide connecting the plurality of the light input terminals, the plurality of the light output terminals and the plurality of the half mirrors, and a having kinked line shape. Each of the plurality of half mirrors is placed at a respective corner of the kinked line shape.

Especially, the kinked line shape includes a polygon network.

Preferably, in the optical coupler, when the number of optical input terminals is Ni, the number of optical output terminals is No, and the number of half mirrors is N, Ni, No, and N satisfy $Ni \leq N$ and $No \leq N$ and the polygon portion has N corners.

In the optical coupler related to the present invention, at least one of the plurality of half mirrors is perpendicular to a bisector of a respective corner of the polygon network.

In the optical coupler related to the present invention, at least one of the plurality of half mirrors is on a bisector of a corresponding angle of the polygon portion.

In the optical coupler related to the present invention, preferably, at least one of the plurality of the light input terminal is placed on a first extension line which is extension of a first side forming the respective corner, and at least one of the plurality of the light output terminal is placed on a second extension line which is extension of a second side forming the respective corner.

In the present invention, at least one of the input terminals and the respective one of the output terminals are combined into an input and output terminal.

In the optical coupler related to the present invention, a mirror is arranged at one angle of the polygon network. Preferably, the mirror is perpendicular to a bisector of an angle of the polygon network at which the mirror is arranged.

Preferably, in the optical coupler, when the number of optical input terminals is Ni, the number of optical output terminals is No, the number of half mirrors is N, and the number of mirrors is Nm, Ni, No, N, and Nm satisfy $Ni \leq N$ and $No \leq N$ and the polygon portion has (N+Nm) angles.

In the optical coupler related to the present invention, a signal input from a first input terminal of the plurality of the first input terminal is output from the plurality of the output terminals except for the output terminal respective to the first input terminal as a pair.

In the optical coupler related to the present invention, an optical axis of the optical waveguide is on a plane.

Preferably, the plurality of half mirrors are perpendicular to the plane.

In the optical coupler related to the present invention, at least two of the plurality of the half mirror have a transparency for P-wave equal to or higher than 90% and a reflectivity for S-wave equal to or higher than 90%, and one of the plurality of the half mirror has a transparency for P-wave equal to or higher than 60% and a reflectivity for S-wave equal to or higher than 60%.

In the optical coupler, preferably, at least two of the plurality of the half mirror have a transparency for P-wave equal to or higher than 95% and a reflectivity for S-wave equal to or higher than 95%.

In the optical coupler related to the present invention, the plurality of the half mirror are a first half mirror, a second half mirror and a third half mirror, wherein a first optical path length between the first and the third half mirror is longer than a second optical path length between the first and the second half mirror, and a third optical path length between the second and the third half mirror. The second half mirror has a transparency for P-wave lower than 90% and a reflectivity for S-wave lower than 90%.

In the optical coupler, preferably, a mirror is placed between the first and the second half mirror and at a respective corner of the polygon network.

In the optical coupler related to the present invention, the waveguide is formed of a photo-curable resin.

In the present invention, a method of manufacturing an optical coupler includes a first step of arranging the plurality of the input terminals, the plurality of the output terminals and the plurality of the half mirrors on a housing, a second step of filling the housing with an optical reactive resin in liquid state, a third step of introducing a light react with and hardening the optical reactive resin so as to form the optical wave guide.

In the manufacturing method, preferably, the light is introduced along a side of the polygon portion.

BRIEF DESCRIPTION OF DRAWINGS

FIG. 7A shows elements of the light coupler of the present invention. FIG. 7B shows an initial stage of the manufacturing method. FIG. 7C shows an initial stage of another manufacturing method.

DETAIL DESCRIPTION OF PREFERRED EMBODIMENTS

Hereinafter, embodiments of the present invention will be described with reference to the drawings.

Figure 1:
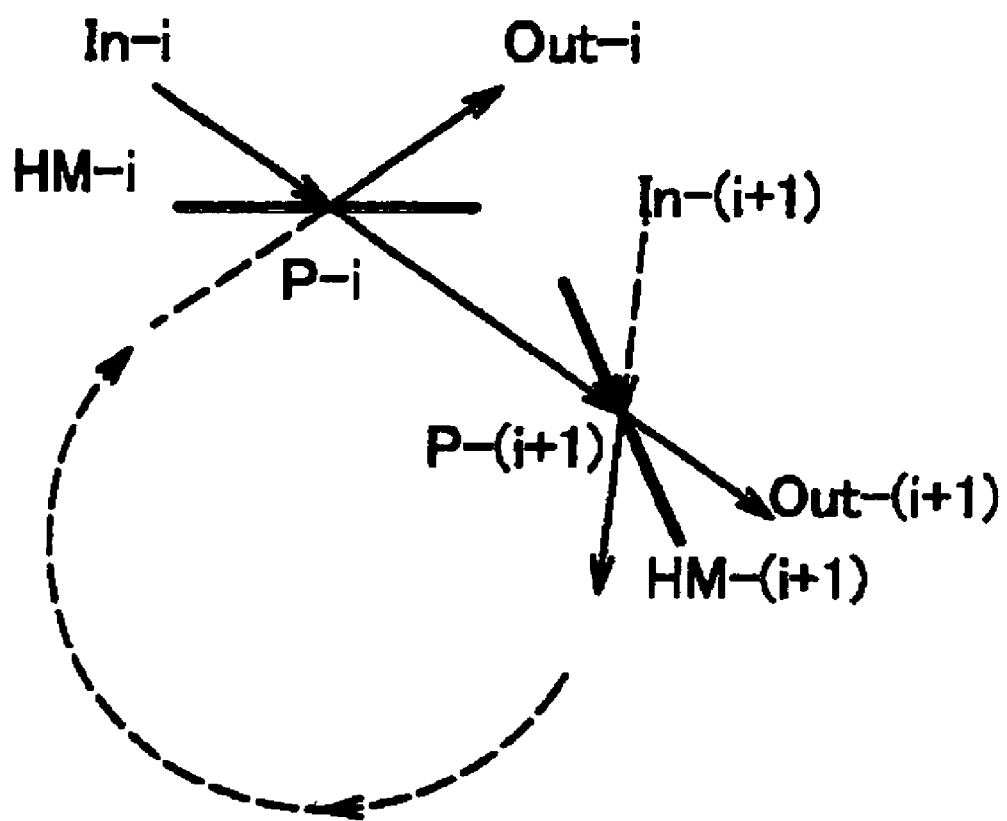
FIG. 1 is an explanatory view showing the principle of the first embodiment of the present invention.

FIG. 1 is a view illustrating a first embodiment of the present invention. In the first embodiment, an optical waveguide forms a kinked line or a polygon and half mirrors are arranged at all corners. It is considered that all signal lights go around clockwise for the polygon. Also, the case where all signal lights go around counterclockwise for the polygon is equally possible.

In this embodiment, the polygon is set to an N-gon (where N is a natural number of at least 2) and each corner is set to P-i (where i is a natural number less than or equal to N). In the following description, i+1−N and i+2−N are shown when i+1 and i+2 exceed N.

As shown in FIG. 1, a half mirror HM-i perpendicular to an interior angle bisector is arranged at an corner P-i. As shown in FIG. 1, two sides making the corner P-i are extended and an input In-i is made from a left oblique upper direction in the extension. At this time, at the corner p-i on the half mirror HM-i, In-i is partially reflected and an output Out-i is made. Transmitted light reaches the corner P-(i+1) neighboring the right of the corner P-i. Since the half mirror HM-(i+1) perpendicular to the interior angle bisector is arranged at the corner P-(i+1), transmitted light of the output Out-i becomes an output Out-(i+1) and the output Out-i is partially reflected and further reaches an corner P-(i+2) neighboring the right thereof. When the input In-i of the signal light is input to the corner P-i, the above-described behavior repeats and the input In-i is distributed to all outputs Out-j (where j is a natural number less than or equal to N) with dissipation. In FIG. 1, the input In-i of the signal light to the corner P-i is reflected by the half mirror HM-i and the signal light is output (Out-i) to a right extension side when viewing an outer side from the corner P-i. While signal light transmitted through the half mirror HM-i goes in the clockwise direction of the polygon, signal light transmitted through the half mirror HM-j of each corner P-j is output (Out-j) to a left extension side when viewing the outer side from the corner P-j. The signal light reflected by the half mirror HM-j of each corner P-j reaches the half mirror HM-(j+1) of the next corner P-(j+1) in the clockwise direction of the polygon. When viewing the outer side from each corner to which signal light to all corners is distributed with dissipation, the signal light is output to the right extension side.

In this embodiment, it is possible to place half mirrors at all corners. Also some of the half mirrors may be replaced by mirror.

As is easily understood, all signal lights input from the left extension side are transmitted in the clockwise direction of the polygon when viewing the outer side from each corner, and signal light is output to the right extension side of each corner when viewing the outer side from each corner.

That is, in the extensions of two sides of the polygon at each corner of the polygon in which the half mirrors are arranged, an optical output terminal may be arranged on the right extension side when viewing the outer side from each corner, and an optical input terminal may be arranged on the left extension side when viewing the outer side from each corner.

Completely inversely, in the extensions of two sides of the polygon at each corner of the polygon in which the half mirrors are arranged, an optical output terminal may be arranged on the left extension side when viewing the outer side from each corner and an optical input terminal may be arranged on the right extension side when viewing the outer side from each corner.

The case where the polygon is a tetragon in a first embodiment will be described with reference to FIGS. 2A, 2B, and 2C.

Figure 2A:
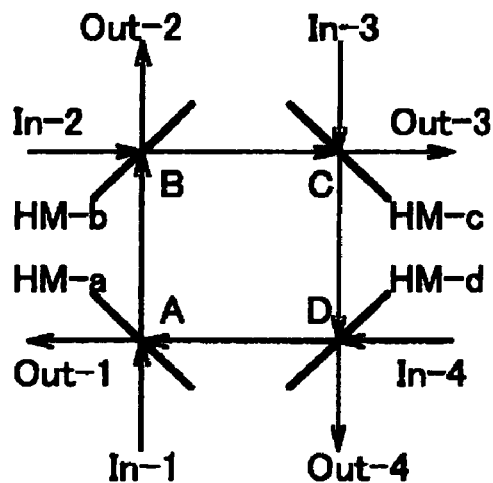
FIGS. 2A to 2C are explanatory views showing the principle of the first embodiment of the present invention when the polygon is a tetragon.
Figure 2B:
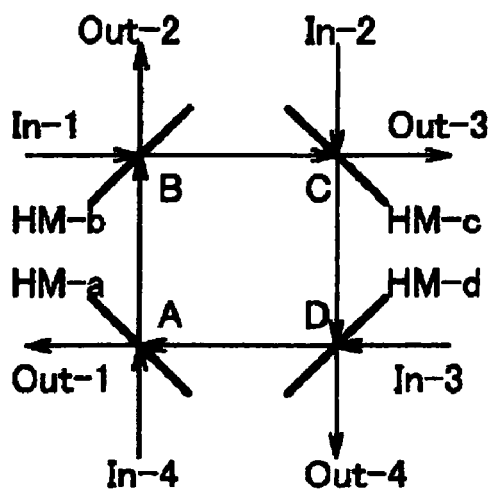

For example, as shown in FIGS. 2A and 2B, the first embodiment can have four pairs of optical input terminals In-1 to 4 and optical output terminals Out-1 to 4. That is, at corners of the tetragon ABCD, the half mirrors HM-a to d are arranged to be perpendicular to interior angle bisectors of the corners. Four corners A, B, C, and D were arranged in the clockwise direction according to convenience.

FIG. 2A shows a configuration in which an input is made from an optical input terminal In-1 in a vector AB direction at a corner A and an output is made from an optical output terminal Out-1 in a vector DA direction. Inputs and outputs at the four different corners are the same.

FIG. 2B shows a configuration in which an input is made from an optical input terminal In-1 in a vector BC direction at an corner B and an output is made from the optical output terminal Out-1 in a vector DA direction at an corner A. Inputs and outputs at the four different corners are the same.

Figure 2C:
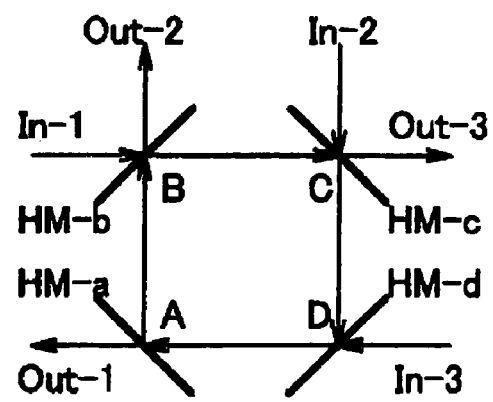

FIG. 2C is a principle view of an optical coupler having three pairs of optical input and output ends by removing In-4 and Out-4 from FIG. 2B.

Figure 3A:
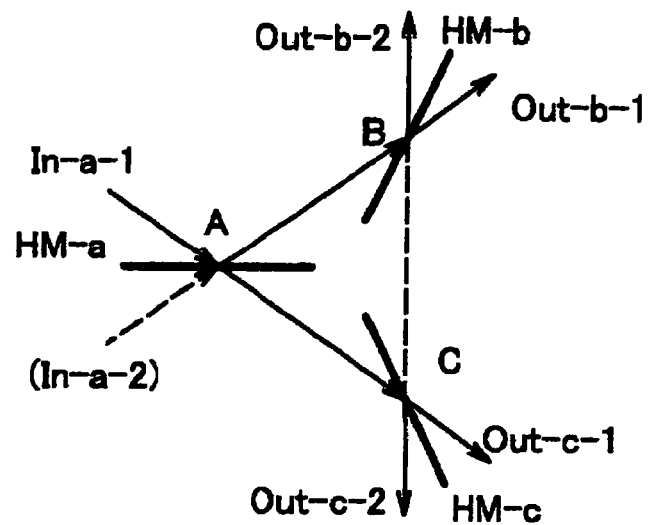
FIGS. 3A to 3C are explanatory views showing the principle of the first embodiment of the present invention when the polygon is a triangle.

Next, the case where the polygon is a triangle in a second embodiment will be described with reference to FIGS. 3A, 3B, and 3C.

The optical waveguide forms a triangle and half mirrors are arranged at all corners. This will be described with reference to FIGS. 3A and 3B. It is assumed that three corners of the triangle are A, B, and C and half mirrors placed thereat are HM-a, HM-b, and HM-c. As shown in FIG. 3A, signal light In-a-1 incident to the half mirror HM-a in a vector AC direction is distributed in vector AB and AC directions and reaches the two corners B and C neighboring the corner A of the triangle ABC. At the corners B and C, the half mirrors HM-b and HM-c make branches in two directions, but these are extension sides of two sides forming the corners B and C of the triangle. In this case, for example, signal light which reached from the corner A to the corner B is not directed to the closer corner C. Similarly, signal light which reached from the corner A to the corner C is not directed to the closer corner B.

Figure 3B:
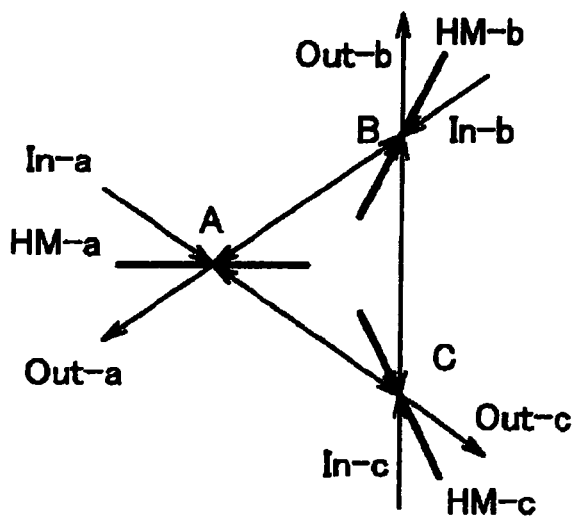
Figure 3C:
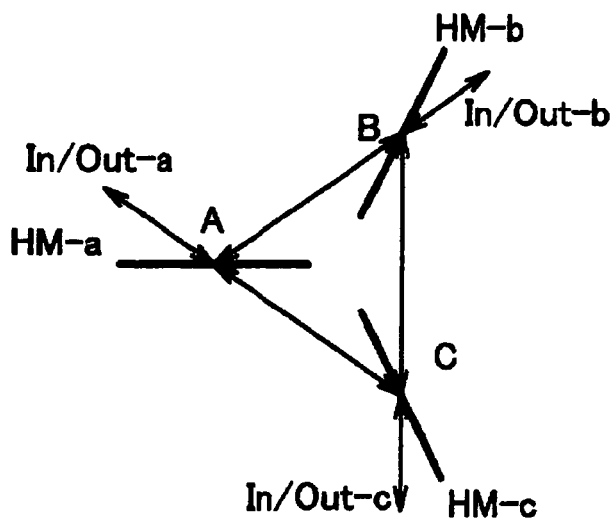

For each corner, an optical input terminal and an optical output terminal forming a pair therewith are surely arranged at the same corner in any one of extension directions of two sides making the corner (FIG. 3B). Then, signal light input from an optical input terminal In-a arranged at the corner A can be output with dissipation from an optical output terminal Out-b arranged at the corner B and an optical output terminal Out-c arranged at the corner C. Similarly, signal light input from an optical input terminal In-b arranged at the corner B can be output with dissipation from the optical output terminal Out-c arranged at the corner C and the optical output terminal Out-a arranged at the corner A, and signal light input from an optical input terminal In-c arranged at the corner C can be output with dissipation from the optical output terminal Out-a arranged at the corner A and the optical output terminal Out-b arranged at the corner B. At this time, a function as the optical coupler is not varied even when the optical input and output ends forming the pair at each corner are independently mixed respectively. When the optical input and output ends are integrated at each corner (FIG. 3C), signal light input from an optical input/output terminal In/Out-a arranged at the corner A can be output with dissipation from an optical input/output terminal In/Out-b arranged at the corner B and an optical input/output terminal In/Out-c arranged at the corner C. Similarly, signal light input from the optical input/output terminal In/Out-b arranged at the corner B can be output with dissipation from the optical input/output terminal In/Out-c arranged at the corner C and the optical input/output terminal In/Out-a arranged at the corner A, and signal light input from the optical input/output terminal In/Out-c arranged at the corner C can be output with dissipation from the optical input/output terminal In/Out-a arranged at the corner A and the optical input/output terminal In/Out-b arranged at the corner B.

Next, a third embodiment will be described with reference to FIGS. 4A, 4B, 4C, 4D, and 4E.

Figure 4A:
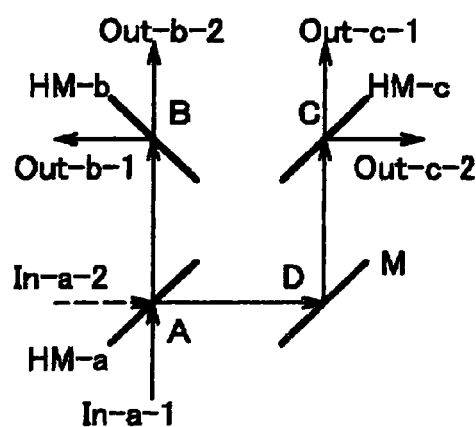
FIGS. 4A to 4E are explanatory views showing the principle of the second embodiment of the present invention.
Figure 4B:
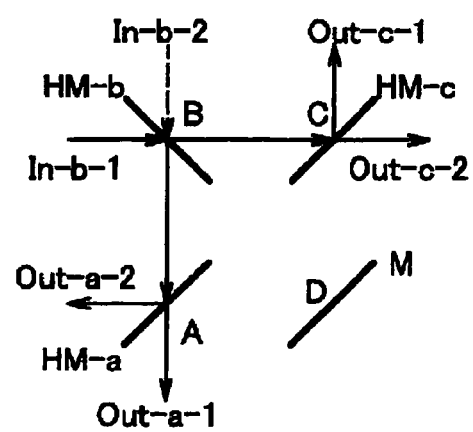

In this embodiment, one mirror is added to the first embodiment of the triangle case and a tetragon is used instead of the triangle. As shown in FIGS. 4A and 4B, the tetragon having four corners A, B, C, and D in the clockwise direction is considered. A mirror M is arranged at the corner D.

As shown in FIG. 4A, signal light In-a-1 incident to a half mirror HM-a in a vector AB direction is distributed in vector AB and AD directions and reaches the two corners B and D neighboring the corner A of the tetragon ABCD. Signal light by the mirror M at the corner D changes to a vector DC direction and reaches the corner C. Branches are made in two directions by half mirrors HM-b and HM-c at the corners B and C, but these are extension sides of two sides forming the corners B and C of the tetragon. In this case, for example, signal light which reached from the corner A to the corner B is not directed to the closer corner C. Similarly, signal light which reached from the corner A to the corner C through the corner D is not directed to the closer corner B. The same is true also in the case of considering signal light In-a-2 incident to the half mirror HM-a in the vector AD direction and in the case of considering signal light incident to the half mirror HM-c in the vector CB direction and the vector CD direction.

As shown in FIG. 4B, signal light In-b-1 incident to a half mirror HM-b in a vector BC direction is distributed in vector BA and BC directions and reaches two corners A and C neighboring the corner B of the tetragon ABCD. Branches are made in two directions by half mirrors HM-a and HM-c at the corners A and C, but these are extension sides of two sides forming the corners A and C of the tetragon. In this case, for example, signal light which reached from the corner B to the corner A is not directed to the closer corner D. Similarly, signal light which arrived from the corner B to the corner C is not directed to the closer corner D. The same is true also in the case of considering signal light In-b–2 incident to the half mirror HM-b in the vector BA direction.

Figure 4C:
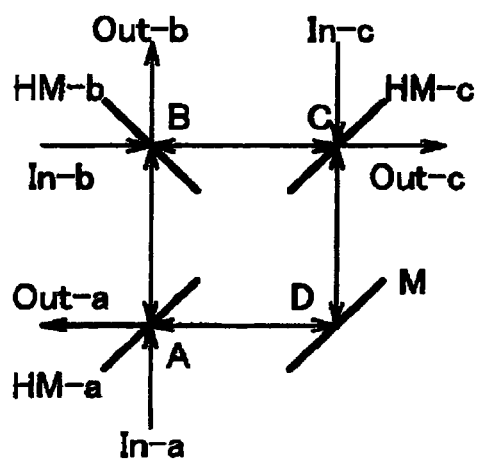
Figure 4D:
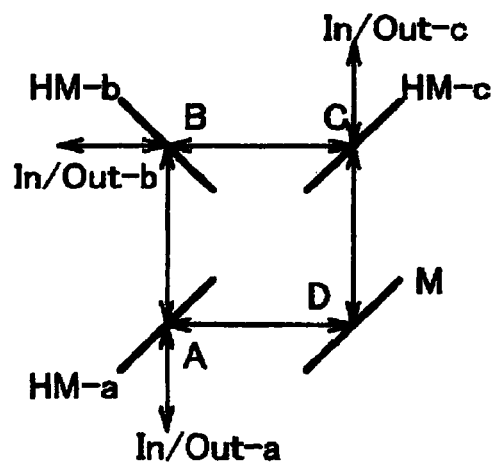
Figure 4E:
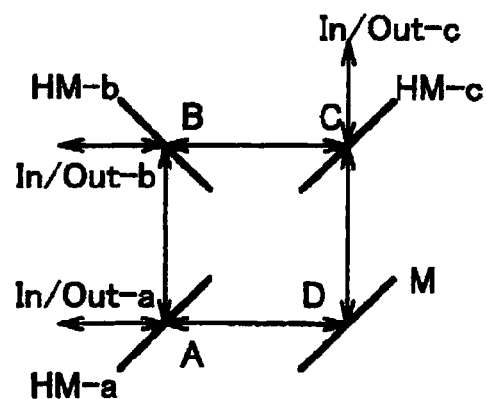

Thus, as shown in FIG. 4C, for the corners A, B, and C, an optical input terminal is arranged in any one of extension directions of two sides forming the corners and an optical output terminal forming the pair therewith is surely arranged at the same corner. Then, signal light input from an optical input terminal In-a arranged at the corner A can be output with dissipation from an optical output terminal Out-b arranged at the corner B and an optical output terminal Out-c arranged at the corner C. Similarly, signal light input from the optical input terminal In-b arranged at the corner B can be output with dissipation from the optical output terminal Out-c arranged at the corner C and the optical output terminal Out-a arranged at the corner A, and signal light input from the optical input terminal In-c arranged at the corner C can be output with dissipation from the optical output terminal Out-a arranged at the corner A and the optical output terminal Out-b arranged at the corner B. At this time, a function as the optical coupler is not varied even when the optical input and output ends forming the pair arranged at the corner are mixed at each corner independent of other corners.

When the optical input and output ends at each corner are integrated (FIGS. 4D and 4E), signal light input from an optical input/output terminal In/Out-a arranged at the corner A can be output with dissipation from an optical input/output terminal In/Out-b arranged at the corner B and an optical input/output terminal In/Out-c arranged at the corner C. Similarly, signal light input from the optical input/output terminal In/Out-b arranged at the corner B can be output with dissipation from the optical input/output terminal In/Out-c arranged at the corner C and the optical input/output terminal In/Out-a arranged at the corner A, and signal light input from the optical input/output terminal In/Out-c arranged at the corner C can be output with dissipation from the optical input/output terminal In/Out-a arranged at the corner A and the optical input/output terminal In/Out-b arranged at the corner B.

Thus, the optical input terminal, the optical output terminal, the optical input/output terminal, the half mirror, and the mirror are connected by an axis-shaped core so as to include all optical paths shown in the drawings. Thus, a light coupler is formed from the n-gon portion of the core and the branches which are extensions of each side of the n-gon portion passing through the half mirrors. Optionally, an optical fiber and another external optical waveguide can be easily connected to the optical input terminal, the optical output terminal, and the optical input/output terminal by processing a housing before forming the core. Thus, the optical coupler can be easily manufactured by making a curing-light introduction end for forming the core and the optical input terminal, the optical output terminal, and the optical input/output terminal forming the core at the same position of the housing. The periphery of the core is optionally covered by a clad material.

Next, the third embodiment will be described with reference to FIGS. 5A, 5B, 6A, 6B, 6C, 6D, 6E, and 6F.

A feature of this embodiment is that an optical axis of an optical waveguide is arranged within one common plane and a half mirror is perpendicular to the common plane when connecting three optical input terminals and three optical output terminals by an optical waveguide core using three half mirrors. That is, an incidence plane is common and each half mirror can totally or at least partially separates an s wave and a p wave.

For example, if all half mirrors reflect 100% of the s wave and 0% of the p wave and transmit 100% of the p wave and 0% of the s wave, 50% out of 100% of the s wave and 100% of the p wave, that is, the original signal light, reaches two different output ends even when signal light incident from one input end passes through two half mirrors.

Next, if the first half mirror reflects 90% of the s wave and 10% of the p wave and the second half mirror reflects 70% of the s wave and 30% of the p wave, 33% of the original signal light is reached according to 63% of the s wave and 3% of the p wave.

Similarly, if the first half mirror transmits 10% of the s wave and 90% of the p wave and the second half mirror transmits 30% of the s wave and 70% of the p wave, 33% of the original signal light is reached according to 3% of the s wave and 63% of the p wave.

In this embodiment, the arrival efficiency of both the two half mirrors is remarkably improved as compared to the arrival efficiency of 25% in the case of transmission of 50% and reflection of 50% without a polarization characteristic.

In the coupler related to this embodiment, the arrangement of an optical input terminal, an optical output terminal, a half mirror, and an optical waveguide connecting them is optional. For example, half mirrors can be arranged at three corners of a regular triangle. For example, the degree of freedom of a design of the optical coupler can increase by arranging a perfect reflection mirror. A perfect reflection mirror and a half mirror can be alternately arranged at corners of a regular hexagon using three perfect reflection mirrors.

However, it is difficult that optical path lengths of an optical waveguide to the half mirror closest to each optical input terminal and each optical output terminal, and optical path lengths of an optical waveguide between the half mirrors are set to be completely equal. In the test step, because of the reasons depending upon an optical waveguide manufacturing method, for example, mismatch of optical axis in two directions, the difference in dissipation caused at a portion like the connection portion with half mirrors of each optical waveguides becomes different depending on six patterns of light input end and output end settings.

One of the half mirrors can be used to regulate the dissipation. That is, when all the half mirrors are set to reflect 100% of the s wave and 0% of the p wave and transmit 100% of the p wave and 0% of the s wave, the balance with other transmission paths can be made by increasing the transmission dissipation of a transmission path with small transmission dissipation.

When this method is used, for example, the degree of freedom of a design of an optical waveguide of the optical coupler can increase by arranging a perfect reflection mirror. For example, one perfect reflection mirror and three half mirrors can be arranged at four corners of a square and the transmission dissipation of the half mirror arranged at an opposite angle to the perfect reflection mirror can increase. Thereby, an increase in the transmission dissipation can be balanced by the dissipation when an optical path length through the perfect reflection mirror is increased by one side of the square and the dissipation upon reflection of the perfect reflection mirror. That is, when a signal from the same input end can be obtained from two output ends, a power difference of optical signals obtained by the two output ends can be reduced.

In this embodiment, it is ideal that at least two half mirrors totally reflect the s wave and totally transmit the p wave.

However, when considering that the dissipation cannot be 0 in any case or the reality of manufacturing a filter, at least 90% of the s wave and less than 10% of the p wave may be reflected and at least 90% of the p wave and less than 10% of the s wave may be transmitted. Sufficiently, at least 95% of the s wave and less than 5% of the p wave may be reflected and at least 95% of the p wave and less than 5% of the s wave may be transmitted. More preferably, at least 97% of the s wave and less than 3% of the p wave may be reflected and at least 97% of the p wave and less than 3% of the s wave may be transmitted.

As described below, three half mirrors and one perfect reflection mirror are arranged at four corners of a square and three optical input terminals and three optical output terminals are arranged on extensions of four sides of the square, such that the transmission dissipation by a half mirror of a position of an opposite angle to the perfect reflection mirror can be regulated. In this case, a feature of the half mirror is that at least 60% of the s wave and less than 40% of the p wave are reflected and at least 60% of the p wave and less than 40% of the s wave are transmitted. More preferably, at least 80% or less than 90% of the s wave and at least 10% or less than 20% of the p wave may be reflected and at least 80% or less than 90% of the p wave and at least 10% or less than 20% of the s wave may be transmitted. When p-wave transmittance and s-wave reflectance are much lowered, an optical output capable of being obtained finally decreases. Lower limits of the p-wave transmittance and the s-wave reflectance can be regulated between 60% and 90% according to insertion dissipation characteristics of the optical coupler to be formed.

Figure 5A:
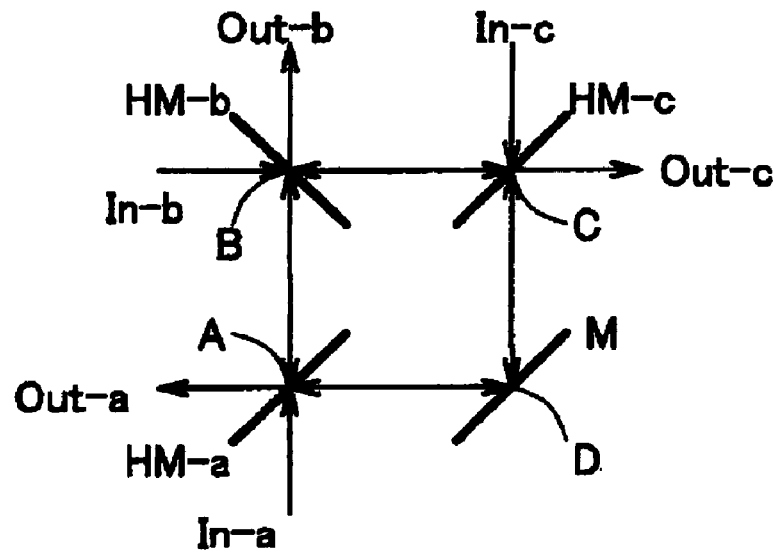
FIGS. 5A to 5B and FIGS. 6A to 6F are explanatory view showing the principle of the third embodiment.

In particular, FIG. 5A is a layout view showing a configuration in which first, second, and third optical input terminals In-a, In-b, and In-c, first, second, and third optical output terminals Out-a, Out-b, and Out-c, first, second, and third half mirrors HM-a, HM-b, and HM-c, and a perfect reflection mirror M are arranged by setting a square ABCD as an incidence plane. In FIG. 1A, the first, second, and third half mirrors HM-a, HM-b, and HM-c and the perfect reflection mirror M are indicated by the thick line, optical paths of light incident from the first, second, and third optical input terminals In-a, In-b, and In-c and optical paths of light emitted from first, second, and the third optical output terminals Out-a, Out-b, and Out-c are indicated by the unidirectional arrow, and optical paths between the first, second, and third half mirrors HM-a, HM-b, and HM-c and the perfect reflection mirror M are indicated by the bidirectional arrow.

In addition to the above description, of course, the core of the optical waveguide is formed on the optical paths of the unidirectional arrow and the bidirectional arrow. All optical paths (indicated by the unidirectional arrow and the bidirectional arrow) are placed within the same common plane as the square ABCD. That is, FIG. 5A shows the reflection and transmission of each incident light within the incidence plane.

The first, second, and third half mirrors HM-a, HM-b, and HM-c include a bisector of an interior angle of three corners A, B, and C of the square ABCD and are formed perpendicular to the square ABCD (incidence plane). The perfect reflection mirror M is formed perpendicular to a bisector of an interior angle of the remaining corner D of the square ABCD.

For the side AB of the square ABCD, the first optical input terminal In-a is arranged on an extension of the corner A side and the second optical output terminal Out-b is arranged on an extension of the corner B side.

For the side BC of the square ABCD, the second optical input terminal In-b is arranged on an extension of the corner B side and the third optical output terminal Out-c is arranged on an extension of the corner C side.

For the side CD of the square ABCD, the third optical input terminal In-c is arranged on an extension of the corner C side.

For the side DA of the square ABCD, the first optical output terminal Out-a is arranged on an extension of the corner A side.

Light incident from the first optical input terminal In-a to the point A of the half mirror HM-a reaches the second optical output terminal Out-b when its transmitted light is transmitted to the point B of the second half mirror HM-b and transmitted through the half mirror HM-b.

Light incident from the first optical input terminal In-a to the point A of the half mirror HM-a reaches the third optical output terminal Out-c when its reflected light is transmitted to the point D of the perfect reflection mirror, transmitted to the point C of the third half mirror HM-c by reflection at the point D, and reflected by the half mirror HM-c.

Light incident from the second optical input terminal In-b to the point B of the half mirror HM-b reaches the third optical output terminal Out-c when its transmitted light is transmitted to the point C of the third half mirror HM-c and transmitted through the half mirror HM-c.

Light incident from the second optical input terminal In-b to the point B of the half mirror HM-b reaches the first optical output terminal Out-a when its reflected light is transmitted to the point A of the first half mirror HM-a and reflected by the half mirror HM-a.

Light incident from the third optical input terminal In-c to the point C of the half mirror HM-c reaches the first optical output terminal Out-a when its transmitted light is transmitted to the point D of the perfect reflection mirror, transmitted to the point A of the first half mirror HM-a by reflection at the point D, and transmitted through the half mirror HM-a.

Light incident from the third optical input terminal In-c to the point C of the half mirror HM-c reaches the second optical output terminal Out-b when its reflected light is transmitted to the point B of the second half mirror HM-b and reflected by the half mirror HM-b.

Figure 5B:
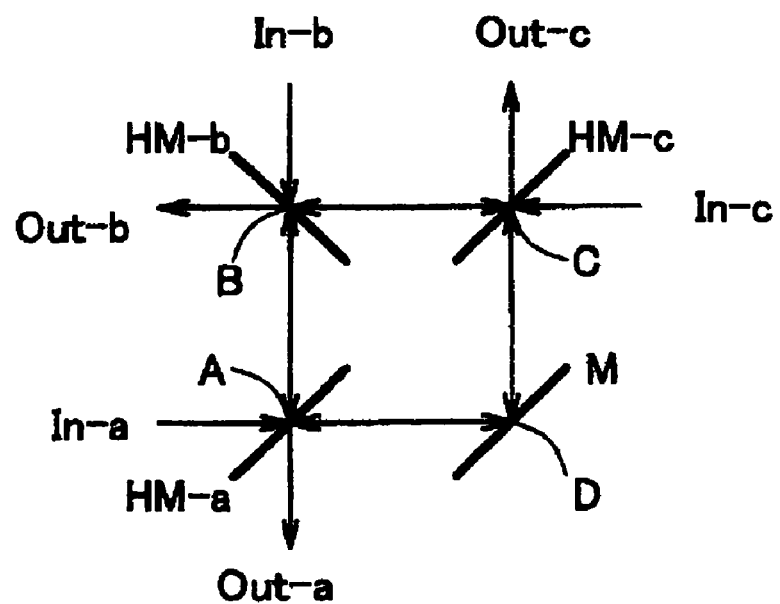

When the half mirrors HM-a, HM-b, and HM-c and the perfect reflection mirror M are arranged at the four corners of the square ABCD, the optical input terminals In-a, In-b, and In-c and the optical output terminals Out-a, Out-b, and Out-c can be arranged as shown in FIG. 5B.

That is, for the side AB of the square ABCD, the optical output terminal Out-a is arranged on an extension of the corner A side and the optical input terminal In-b is arranged on an extension of the corner B side.

For the side BC of the square ABCD, the optical output terminal Out-b is arranged on an extension of the corner B side and the optical input terminal In-c is arranged on an extension of the corner C side.

For the side CD of the square ABCD, the optical output terminal Out-c is arranged on an extension of the corner C side.

For the side DA of the square ABCD, the optical input terminal In-a is arranged on an extension of the corner A side.

Apparently, the layout of FIG. 5B substantially matches the layout of FIG. 5A arranged line-symmetrically with the straight line BD. In the layout of FIG. 5B, "first" is an optical input terminal, an optical output terminal, and a half mirror with the suffix c and "third" is an optical input terminal, an optical output terminal, and a half mirror with the suffix a. Consequently, the layout of FIG. 5B also has the feature of the invention related to claim 5.

When the half mirrors HM-a, HM-b, and HM-c and the perfect reflection mirror M are arranged at the four corners of the square ABCD, other layouts of the optical input and output ends do not function as the optical coupler.

Next, the layout of FIG. 5A shows transmission paths in the case where the half mirror HM-b completely separates the s wave and the p wave and in the case where the half mirror HM-b does not completely separate the s wave and the p wave. It is described that the half mirrors HM-a and HM-c reflect 100% of the s wave and transmit 100% of the p wave.

Here, the case where the half mirror HM-b does not completely separate the s wave and the p wave in the layout of FIG. 5A corresponds to this embodiment.

Hereinafter, there are shown transmission forms of an s wave As and a p wave Ap input from the optical input terminal In-a, an s wave Bs and a p wave Bp input from the optical input terminal In-b, and an s wave Cs and a p wave Cp input from the optical input terminal In-c.

Figure 6A:
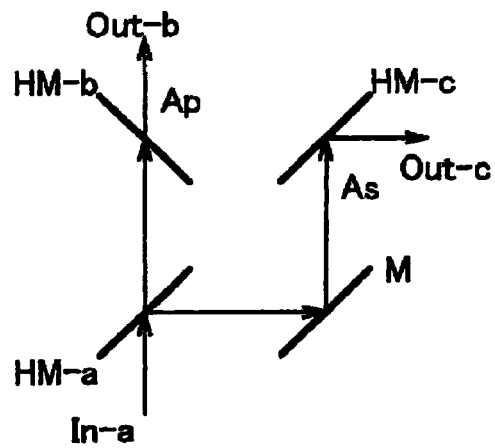
Figure 6B:
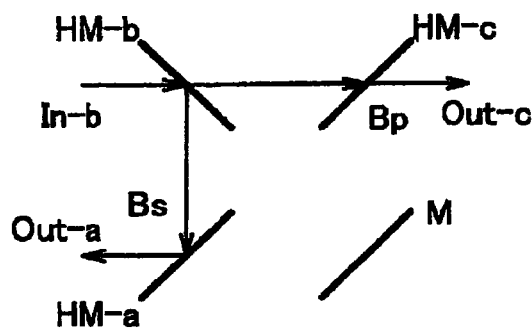
Figure 6C:
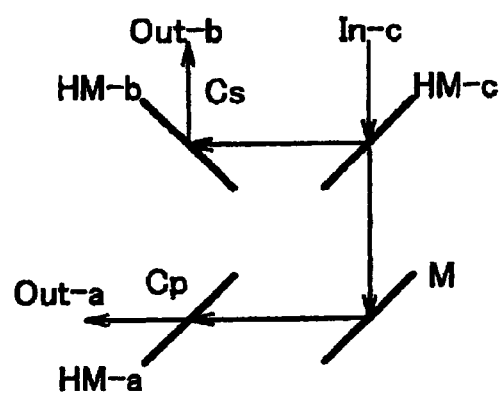

FIGS. 6A, 6B, and 6C are plan views showing transmission paths when the half mirror HM-b completely separates the s wave and the p wave in the layout of FIG. 5A. That is, it is described that the half mirror HM-b reflects 100% of the s wave and transmits 100% of the p wave like the half mirrors HM-a and HM-c.

As shown in FIG. 6A, the s wave As input from the optical input terminal In-a is reflected by the half mirror HM-a, the perfect reflection mirror M, and the half mirror HM-c, and reaches the optical output terminal Out-c. In this regard, dissipation by transmission and reflection is never present.

The p wave Ap input from the optical input terminal In-a is transmitted through the half mirror HM-a and the half mirror HM-b and reaches the optical output terminal Out-b. In this regard, dissipation by transmission and reflection is never present.

As shown in FIG. 6B, the s wave Bs input from the optical input terminal In-b is reflected by the half mirror HM-b and the half mirror HM-a and reaches the optical output terminal Out-a. In this regard, dissipation by transmission and reflection is never present.

The p wave Bp input from the optical input terminal In-b is transmitted through the half mirror HM-b and the half mirror HM-c and reaches the optical output terminal Out-c. In this regard, dissipation by transmission and reflection is never present.

As shown in FIG. 6C, the s wave Cs input from the optical input terminal In-c is reflected by the half mirror HM-c and the half mirror HM-b and reaches the optical output terminal Out-b. In this regard, dissipation by transmission and reflection is never present.

The p wave Cp input from the optical input terminal In-c is transmitted through the half mirror HM-c, reflected by the total reflecting mirror M, and transmitted through the half mirror HM-a, and reaches the optical output terminal Out-a. In this regard, dissipation by transmission and reflection is never present.

Figure 6D:
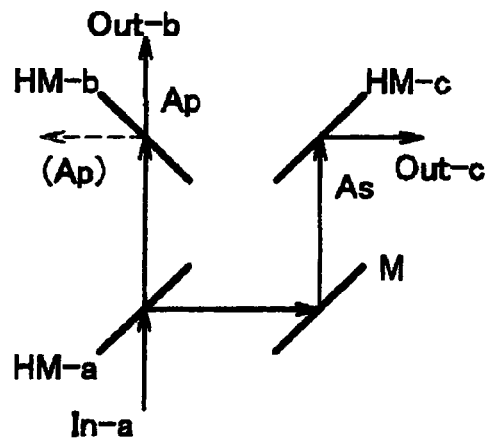
Figure 6E:
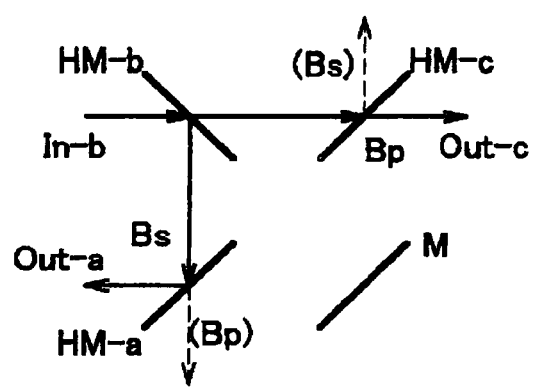
Figure 6F:
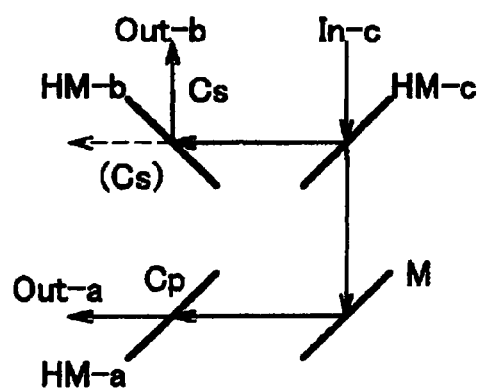

On the other hand, FIGS. 6D, 6E, and 6F are plan views showing transmission paths when the half mirror HM-b does not completely separate the s wave and the p wave in the layout of FIG. 5A. For example, it is described that the half mirror HM-b reflects 85% of the s wave and transmits 15% of the s wave and transmits 85% of the p wave and reflects 15% of the p wave.

As shown in FIG. 6D, the s wave As input from the optical input terminal In-a is reflected by the half mirror HM-a, the perfect reflection mirror M, and the half mirror HM-c, and reaches the optical output terminal Out-c. In this regard, dissipation by transmission and reflection is never present.

The p wave Ap input from the optical input terminal In-a is transmitted through the half mirror HM-a and transmitted through the half mirror HM-b by 85% and reaches the optical output terminal Out-b. The remaining 15% is reflected and lost by the half mirror HM-b.

As shown in FIG. 6E, the s wave Bs input from the optical input terminal In-b is reflected by the half mirror HM-b by 85% and reflected by the half mirror HM-a, and reaches the optical output terminal Out-a. In this case, 15% of the s wave Bs is transmitted through the half mirror HM-b and reflected and lost by the half mirror HM-c.

The p wave Bp input from the optical input terminal In-b is transmitted through the half mirror HM-b by 85% and transmitted through the half mirror HM-c and reaches the optical output terminal Out-c. In this case, 15% of the p wave Bp is reflected by the half mirror HM-b and transmitted and lost through the half mirror HM-a.

As shown in FIG. 6C, the s wave Cs input from the optical input terminal In-c is reflected by the half mirror HM-c and reflected by the half mirror HM-b by 85%, and reaches the optical output terminal Out-b. The remaining 15% is transmitted and lost through the half mirror HM-b.

The p wave Cp input from the optical input terminal In-c is transmitted through the half mirror HM-c, reflected by the perfect reflection mirror M, transmitted through the half mirror HM-a, and reaches the optical output terminal Out-a. At this time, dissipation by transmission and reflection is never present.

Next, a method of manufacturing the optical coupler related to the present invention will be described with reference to the drawings. In the description of the following manufacturing method, a procedure for creating one example of the present invention will be described.

Various techniques disclosed in the above four patent documents may be used in order to adapt a self-forming optical waveguide as the optical waveguide of the optical coupler according to the invention. An optical coupler which forms only a core but does not form a clad, that is, one that use air around the core as clad may also be used.

Any available photo-curable resin liquid may be applied for forming the self-forming optical waveguide. Arbitrary curing mechanism may also be employed, in addition to radical polymerization, cation polymerization, and so on. Generally, a laser light is preferable as for a curing light. The curing rate of photo-curable resin liquid may be adjusted with wavelength and strength of the laser. Furthermore, any available photo-curing initiator (photopolymerization initiator) may be applied in accordance with the wavelength of the laser and photo-curable resin liquid. About details of the above items, the patent document in which the applicant of the present invention is a co-applicant, for example, JP-2004-149579, describes as follows.

Those including at least one aromatic ring such as phenyl in the structural unit provide a high refractive index, whereas those including only aliphatic series provide a low refractive index. In order to lower the refractive index, a part of hydrogen in the structural unit may be substituted with fluorine.

The aliphatic series includes polyvalent alcohols such as ethylene glycol, diethylene glycol, triethylene glycol, tetraethylene glycol, propylene glycol, dipropylene glycol, tripropylene glycol, tetrapropylene glycol, neopentyl glycol, 1,3-propanediol, 1,4-butanediol, 1,5-pentanediol, 1,6-hexandiol, trimethylolpropane, pentaerythritol, and dipentaerythritol.

The aromatic series includes various kinds of phenol compounds such as bisphenol A, bisphenol S, bisphenol Z, bisphenol F, novolak, o-crezol novolak, p-crezol novolak, and p-alkylphenol novolak.

The following functional groups may be introduced as a reactive group to a relatively low molecular-weight (molar weight of about 3000 or less) skeleton having a structure of those mentioned above or olygomer (polyether) of one or more polyvalent alcohols arbitrary selected from the above examples.

[Radical Polymerizable Material]

An optical polymerizable monomer and/or olygomer having one or more, preferably two or more radical polymerizable ethylene unsaturated reactive groups such as an acryloyl group in the structural unit. Examples of those having an ethylene unsaturated reactive group include ester conjugated acids such as (meta)acrylate ester, itaconate ester, and maleate ester.

[Cationically Polymerizable Material]

An optical polymerizable monomer and/or olygomer having one or more, preferably two or more cationically polymerizable reactive ether structures such as an oxirane ring (epoxide) and oxetane ring in the structural unit. Examples of the oxirane ring (epoxide) include 3,4-epoxycyclohexyl group and the like, in addition to an oxiranyl group. The oxetane ring is ether with a 4-membered ring structure.

[Radical Polymerization Initiator]

A radical polymerization initiator is the compound which activates the polymerization reaction of radical polymerizable materials composed of radical polymerizable monomer and/or olygomer by light. Specific examples include benzoins such as benzoin, benzoinmethylether, benzoinpropylether, and the like, acetophenones such as acetophenone, 2,2-dimethoxy-2-phenylacetophenone, 2,2-diethoxy-2-phenylacetophenone, 1,1-dichloroacetophenone, 1-hydroxycyclohexylphenylketone, 2-methyl-1-(4-(methylthio)phenyl)-2-morpholinopropan-1-one, N,N-dimethylaminoacetophenone and the like, anthraquinones such as 2-methylanthoraquinone, 1-chloroanthraquinone, 2-amylanthraquinone and the like, thioxanthones such as 2,4-dimethylthioxanthone, 2,4-diethylthioxanthone, 2-chlorothioxanthone, 2,4-diisopropylthioxanthone, and the like, ketals such as acetophenonedimethylketal, hexyldimethylketal and the like, benzophenones such as benzophenone, methylbenzophenone, 4,4'-dichlorobenzophenone, 4,4'-bis-diethylaminobenzophenone, Michler's ketone, 4-benzoyl-4'-methyldiphenylsulfide and the like, 2,4,6-trimethylbenzoyldiphenylphosphineoxide and the like. The radical polymerization initiator is not limited thereto and may be used singly or in combination of two or more kinds.

[Cation Polymerization Initiator]

A cation polymerization initiator is the compound which activates the polymerization reaction of cationically polymerizable materials composed of cationically polymerizable monomer and/or olygomer by light. Specific examples include diazonium salt, iodonium salt, sulfonium salt, selenium salt, pyridinium salt, ferrocenium salt, phosphonium salt, and thiopyrinium salt. However, preferred are relatively thermally-stable onium salt photopolymerization initiators, such as aromatic iodonium salt including diphenyliodonium, ditolyliodonium, phenyl(p-anisyl)iodonium, bis(p-t-butylphenyl)iodonium, bis(p-chlorophenyl)iodonium and the like, and aromatic sulfonium salt including diphenylsulfonium, ditolylsulfonium, phenyl(p-anisyl)sulfonium, bis(p-t-butylphenyl)sulfonium, bis(p-chlorophenyl)sulfonium and the like. When an onium salt photopolymerization initiator such as aromatic iodonium salt and aromatic sulfonium salt is used, examples of anion include $BF_4^-$, $AsF_6^-$, $SbF_6^-$, $PF_6^-$, $B(C_6F_5)_4^-$ and the like. The cation polymerization initiator is not limited thereto and they may be used singly or in combination of two or more kinds.

A production method of an optical coupler according to the invention will be explained with reference to the following drawings. Of course, the production method of an optical coupler described below is not limited to the application of a photo-curable resin and a polymerization initiator mentioned above.

Figure 7A:
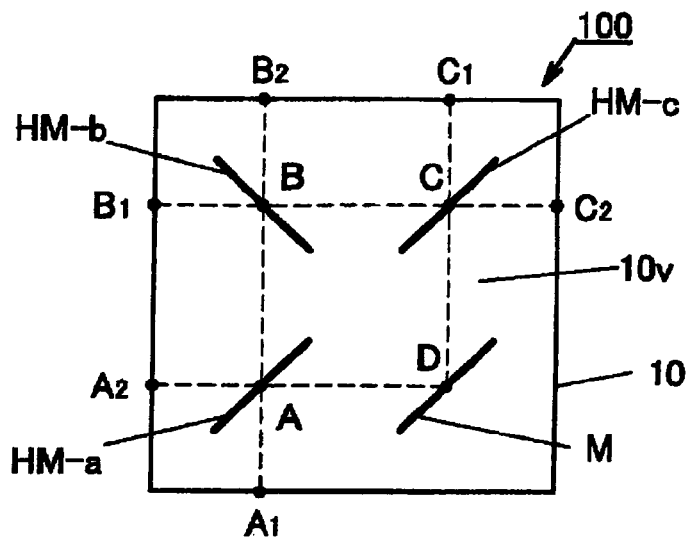
FIGS. 7A to 7C are explanatory views showing the manufacturing method for the light coupler of the present invention.

FIG. 7A is a plan view showing a configuration of one example of a constituent component 100 of one embodiment of the optical coupler related to the present invention. The constituent component 100 can retain a liquefied resin in an inner portion 10v and includes a housing 10 having connection ends $A_1$, $A_2$, $B_1$, $B_2$, $C_1$, and $C_2$ for connecting an optical fiber and another external optical waveguide, and three half mirrors HM-a, HM-b, and HM-c and one mirror M fixed to the inner portion. Four corners of a tetragon ABCD are arranged in the inner portion 10v of the housing 10 such that four points $A_1$, A, B, and $B_2$, three points $A_2$, A, and D, four points $B_1$, B, C, and $C_2$, and three points $C_1$, C, and D are placed on the same line in this order, respectively. At the three corners A, B, and C of the tetragon ABCD, the three half mirrors HM-a, HM-b, and HM-c are arranged on a plane including the interior angle bisector perpendicularly to a plane made by two sides forming each corner. At the remaining corner D of the tetragon ABCD on the design, the one mirror M is arranged perpendicular to the interior angle bisector.

Figure 7B:
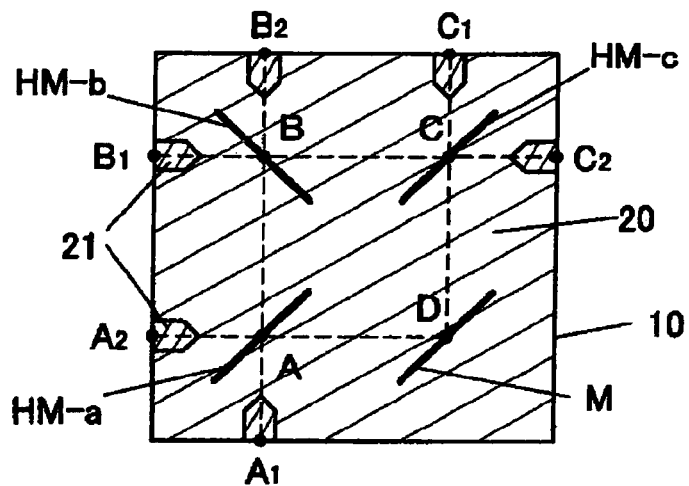

FIG. 7B is an illustrative view showing an initial step of one example of a method of manufacturing the optical coupler of one embodiment related to the present invention. Using the constituent component 100 of the optical coupler of FIG. 7A, an axis-shaped core 21 is formed by filling a liquefied photo-curable resin 20 in the housing 10 and introducing curing light of a wavelength to cure a photo-curable resin from all the six connection ends $A_1$, $A_2$, $B_1$, $B_2$, $C_1$, and $C_2$ to a vector $A_1A$ direction, a vector $A_2A$ direction, a vector $B_1B$ direction, a vector $B_2B$ direction, a vector $C_1C$ direction, and a vector $C_2C$ direction inside the housing 10.

Figure 7C:
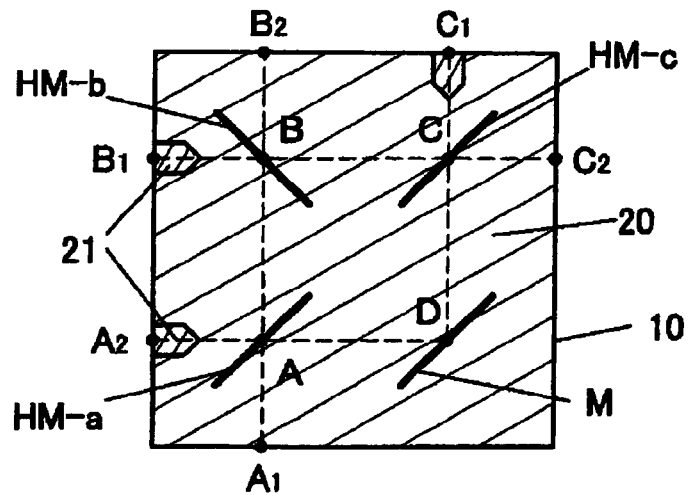

FIG. 7C is an illustrative view showing an initial step of one example of a method of manufacturing the optical coupler of one embodiment related to the present invention. Using the constituent component 100 of the optical coupler of FIG. 7A, the axis-shaped core 21 is formed by filling the liquefied photo-curable resin 20 in the housing 10 and introducing curing light of a wavelength to cure a photo-curable resin from the three connection ends $A_2$, $B_1$, and $C_1$ to the vector $A_2A$ direction, the vector $B_1B$ direction, and the vector $C_1C$ direction inside the housing 10.

The principle capable of obtaining a desired optical coupler by curing the axis-shaped core as shown in FIG. 7B or 7C in self-formation using the constituent component 100 of the optical coupler of FIG. 7A will be described with reference to FIG. 8. In FIG. 8, the housing 10 and the six connection ends $A_1$, $A_2$, $B_1$, $B_2$, $C_1$, and $C_2$ are omitted, and paths of light incident to the three half mirrors HM-a, HM-b, and HM-c and the one mirror M are considered.

As described in the above-described four patent documents, the self-forming optical waveguide by the inventors of the present application is grown as a long axis-shaped core when a curing material of a liquefied photo-curable resin generates light concentrating action.

Figure 9A:
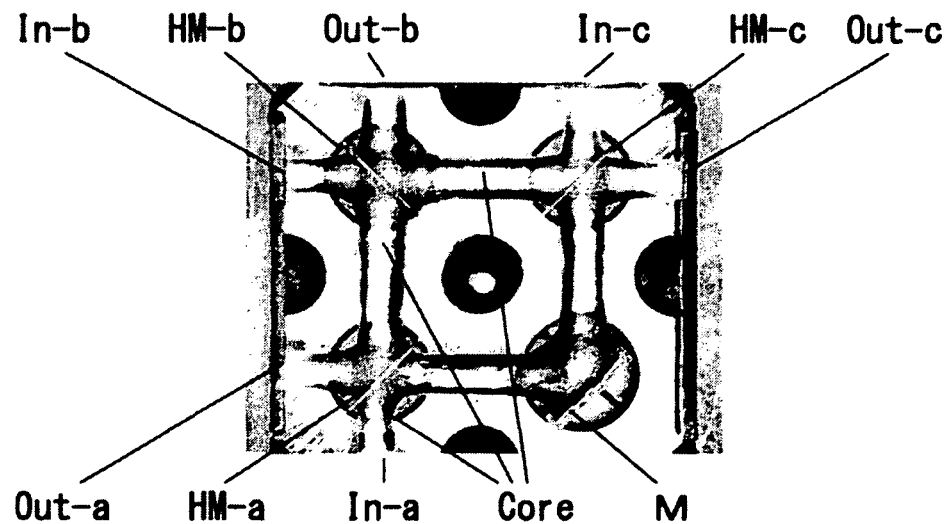
FIGS. 9A to 9B and FIG. 10 are photographs of the optical coupler obtained by the manufacturing method of the present invention.

From the above description, it can be understood that, for example, desired optical couplers as shown in FIGS. 9A and 9C are respectively obtained by curing the axis-shaped core as shown in FIG. 7B or 7C in self-formation using the constituent component 100 of the optical coupler of FIG. 7A.

In each drawing of FIGS. 8A to 8F, for example, light of a wavelength to cure the photo-curable resin is radiated from all positions indicated as an optical input terminal, an optical output terminal, or an optical input/output terminal. Then, an axis-shaped self-forming optical waveguide starts to be grown from the positions indicated as the optical input terminal, the optical output terminal, and the optical input/output terminal. Thus, a core is formed along an optical path indicated in each drawing of FIG. 8. When the core is grown and united from a different direction, it is preferred that a side surface of a union portion has a smooth pillar shape by a so-called optical soldering effect. Upon growth to a reflection (bent) portion of the half mirror and the mirror from two directions, a core of a large-diameter convex can be formed by the optical solder effect also in the reflection (bent) portion.

Thus, the optical input terminal, the optical output terminal, the optical input/output terminal, the half mirror, and the mirror are connected by the axis-shaped core so as to include all optical paths shown in the drawings of FIG. 8. A tetragon portion of the core and a branch-shaped portion of the core extending each side of the tetragon portion by passing through the half mirror form the optical coupler. Optionally, an optical fiber and another external optical waveguide can be easily connected to the optical input terminal, the optical output terminal, and the optical input/output terminal by processing a housing before forming the core. Thus, the optical coupler can be easily manufactured by making a curing-light introduction end for forming the core and the optical input terminal, the optical output terminal, and the optical input/output terminal forming the core at the same position (the connection end of the present invention) of the housing. The periphery of the core is optionally covered by a clad material.

Figure 8A:
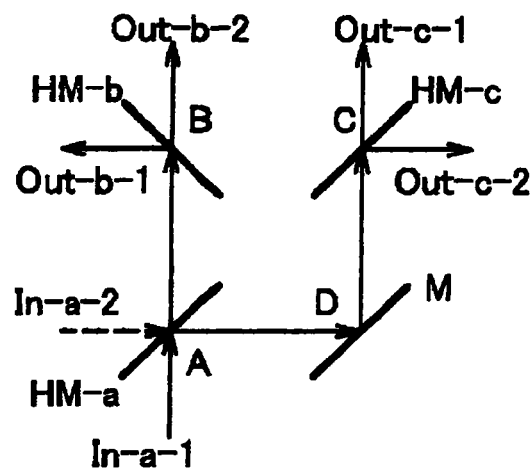
FIGS. 8A to 8E are explanatory views showing the light paths during manufacturing and use of the light coupler of the present invention.
Figure 8B:
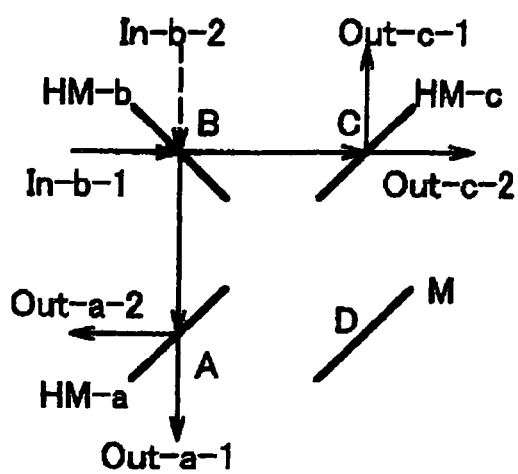

When the curing light of the photo-curable resin is introduced from a total of two directions of one of In-b-1 and In-b-2 and one of In-a-1 and In-a-2 as shown in FIGS. 8A and 8B, it can be understood that the optical coupler as shown in FIG. 9A can be obtained finally. Similarly, when the curing light of the photo-curable resin is introduced from a total of two directions of one of In-b-1 and In-b-2 and one of In-c-1 and In-c-2, it can be understood that the optical coupler as shown in FIG. 9A can be obtained finally.

The optical couplers of FIGS. 9A and 9B will be described in detail later.

When the optical coupler as shown in FIG. 9A is obtained by growing a core from six positions as shown in FIG. 7B, optical input and output ends to be connected to each connection end will be further described as one example. Also in FIG. 8C, the housing 10 and the six connection ends $A_1$, $A_2$, $B_1$, $B_2$, $C_1$, and $C_2$ are omitted, and paths of light incident to the three half mirrors HM-a, HM-b, and HM-c and the one mirror M are considered.

Figure 8C:
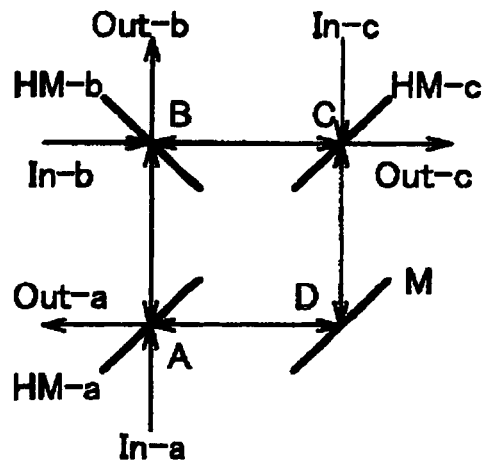

As shown in FIG. 8C, for the corners A, B, and C, an optical input terminal and an optical output terminal forming a pair therewith are surely arranged at the same corner in any one of extension directions of two sides making the corners. Then, signal light input from an optical input terminal In-a arranged at the corner A can be output with dissipation from an optical output terminal Out-b arranged at the corner B and an optical output terminal Out-c arranged at the corner C. Similarly, signal light input from the optical input terminal In-b arranged at the corner B can be output with dissipation from the optical output terminal Out-c arranged at the corner C and the optical output terminal Out-a arranged at the corner A, and signal light input from the optical input terminal In-c arranged at the corner C can be output with dissipation from the optical output terminal Out-a arranged at the corner A and the optical output terminal Out-b arranged at the corner B.

That is, the optical input terminal In-a, the optical output terminal Out-a, the optical input terminal In-b, the optical output terminal Out-b, the optical input terminal In-c, and the optical output terminal Out-c are connected to the six connection ends $A_1$, $A_2$, $B_1$, $B_2$, $C_1$, and $C_2$, for example, in sequence. At this time, for example, the optical input terminal In-a and the optical output terminal Out-a are connected to one optical terminal in a pair. Similarly, the optical input terminal In-b and the optical output terminal Out-b are a pair and the optical input terminal In-c and the optical output terminal Out-c are a pair.

At this time, a function as the optical coupler is not varied even when the optical input and output ends forming the pair at each corner are mixed at each corner independent of other corners.

In this case, in the optical coupler as shown in FIG. 9A, the path from the optical input terminal In-a to the optical output terminal Out-a in FIG. 8C should be absent ideally, but partial leakage occurs due to diffusion, etc., as shown in the following embodiment.

Figure 8D:
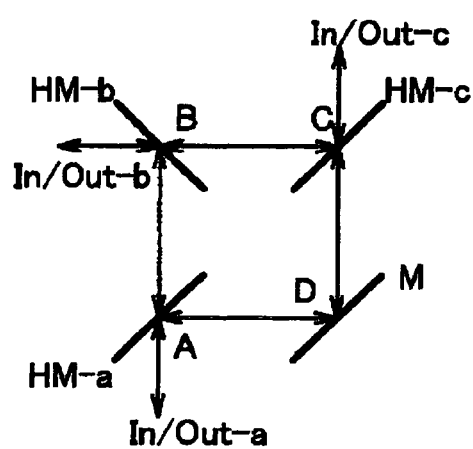
Figure 8E:
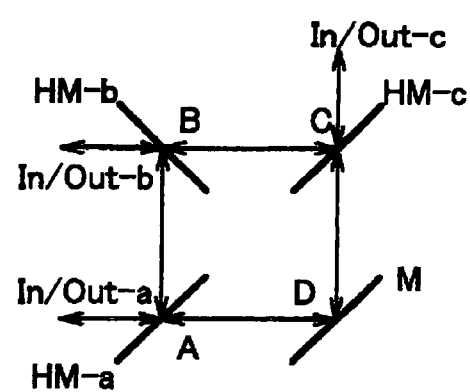

Other examples are shown in FIGS. 8D and 8E. When the optical coupler as shown in FIG. 9B is obtained by growing the core from three positions as shown in FIG. 7C, three optical input/output terminals In/Out-a, b, and c in which the optical input terminal and the optical output terminal are integrated as shown in FIG. 8E should be connected to the connection ends. That is, signal light input from the optical input/output terminal In/Out-a arranged at the corner A can be output with dissipation from the optical input/output terminal In/Out-b arranged at the corner B and the optical input/output terminal In/Out-c arranged at the corner C. Similarly, signal light input from the optical input/output terminal In/Out-b arranged at the corner B can be output with dissipation from the optical input/output terminal In/Out-c arranged at the corner C and the optical input/output terminal In/Out-a arranged at the corner A, and signal light input from the optical input/output terminal In/Out-c arranged at the corner C can be output with dissipation from the optical input/output terminal In/Out-a arranged at the corner A and the optical input/output terminal In/Out-b arranged at the corner B.

As is easily understood, the three ends In/Out-a, b, and c as shown in FIG. 8D can be connected when three positions at which the core of FIG. 7C is grown are connection points $A_1$, $B_1$, and $C_1$.

Figure 9B:
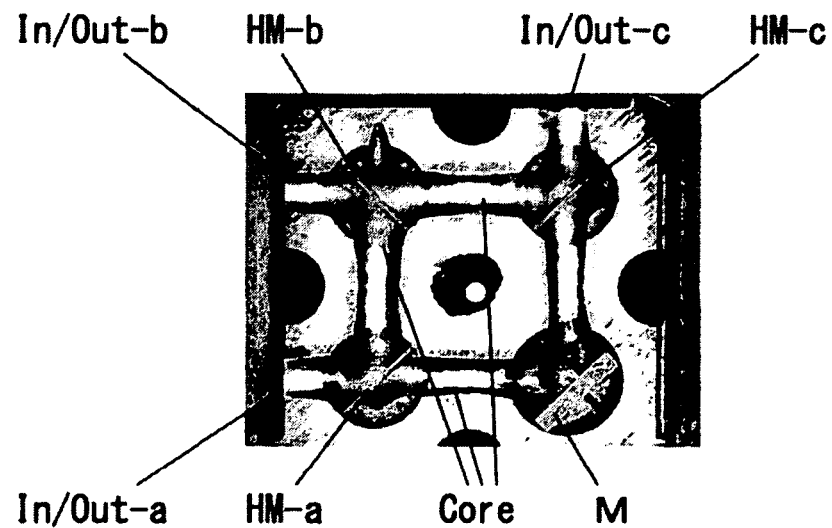

When the optical coupler as shown in FIG. 9B is obtained by growing the core from the three positions as shown in FIG. 7C, it is preferred that the core is not grown in connection ends ($A_1$, $B_2$, and $C_2$ in FIG. 7C) other than connection ends ($A_2$, $B_1$, and $C_1$ in FIG. 7C) at which the core starts to grow. However, a core may be partially formed from three half mirrors in $A_1$, $B_2$, and $C_2$ directions as shown in FIG. 3B. Also in this case, the assessment of the present invention is not lowered.

The above configuration can be realized by a method of manufacturing the optical waveguide using a photo-curable resin as described in the above-described four patent documents.

An ideal state based on the geometric optics has been described using FIG. 8. However, for example, since the optical waveguide is a core with a diameter using the photo-curable resin, and a half mirror and/or a mirror are not mere planes but have a thickness, diffusion light occurs, for example, such that the diffusion light may reach a position at which the diffusion light should not arrive in the description of FIG. 8 as noise.

The principle of the present invention has been described by greatly simplifying the description of FIG. 8. The transmission path of the optical waveguide with the diameter is shown like a straight line, but the optical coupler related to the present invention is not surely limited to all signal paths as described using FIG. 8.

Next, the optical coupler specifically created using the above-described optical coupler manufacturing method will be described with reference to the drawings.

FIGS. 9A and 9B are photo views of the specifically created optical coupler related to the present invention. Using the constituent component 100 of the optical coupler of FIG. 7A, the optical coupler of FIG. 9A was obtained by introducing curing light from six connection ends $A_1$, $A_2$, $B_1$, $B_2$, $C_1$, and $C_2$ as shown in FIG. 7B and curing the axis-shaped core in self-formation. Using the constituent component 100 of the optical coupler of FIG. 7A, the optical coupler of FIG. 9B was obtained by introducing curing light from three connection ends $A_2$, $B_1$, and $C_1$ as shown in FIG. 7C and curing the axis-shaped core in self-formation.

In both the cases, three half mirrors and one mirror are placed at four corners and one side of a tetragon is 5 mm.

In order to introduce the curing light from the six connection ends $A_1$, $A_2$, $B_1$, $B_2$, $C_1$, and $C_2$, for example, the curing light of a wavelength to cure the photo-curable resin 20 using the optical fiber is introduced. For example, it is preferred that the curing light is laser light. According to techniques in the above-described Patent Documents 1 to 4, concentration of light occurs when a refractive index of a curing material is higher than that of a non-curing liquefied material and a long axis-shaped core is sequentially grown from six introduction ends of the curing light. When the axis-shaped core reaches three half mirrors and one mirror, the axis-shaped core is further grown by transmission and reflection. In this case, a union portion of the core extended from a different direction has a smooth side surface by a so-called optical solder, thereby forming the axis-shaped core of one body. Thus, when the axis-shaped core is formed in all directions of transmission and reflection by the three half mirror and the one mirror with respect to a center axis of light from the six introduction ends, the six input/output ends are connected to the three half mirrors and the one mirror by the core of the optical waveguide having the diameter. This optical waveguide substantially transmits light from one optical input terminal to four optical output terminals as described with reference to FIGS. 8A and 8B.

The optical coupler of FIG. 9A is an optical coupler whose principle has been described as the embodiment of the invention in FIG. 4C. Three half mirrors and one mirror are placed at four corners and one side of a tetragon is 5 mm. In order to form the optical coupler of FIG. 9A, for example, the bottom of a transparent housing is fixed to three half mirrors and one mirror and filled with a liquefied photo-curable resin and curing light of a wavelength to cure the photo-curable resin, for example, using the optical fiber, from positions of six input/output ends is introduced. It is preferred that the curing light is laser light. According to the technique in the above-described Patent Documents 1 to 4, concentration of light occurs when a refractive index of a curing material is higher than that of a non-curing liquefied material and a long axis-shaped core is sequentially grown from six introduction ends of the curing light. When the axis-shaped core reaches three half mirrors and one mirror, the axis-shaped core is further grown by transmission and reflection. In this case, a union portion of the core extended from a different direction has a smooth side surface by a so-called optical solder, thereby forming the axis-shaped core of one body. Thus, when the axis-shaped core is formed in all directions of transmission and reflection by the three half mirror and the one mirror with respect to a center axis of light from the six introduction ends, the six input/output ends are connected to the three half mirrors and the one mirror by the core of the optical waveguide having the diameter. This optical waveguide substantially transmits light from one optical input terminal to four optical input terminals as described with reference to the drawings of FIG. 4.

Actually, in the optical coupler of FIG. 9A, it has been found that the unwanted transmission dissipation from In-a to Out-a is about 10 dB larger than the transmission dissipation from In-a to Out-b, c and the optical coupler can be used as a good optical coupler.

FIG. 9A shows a completion photo of the optical coupler whose principle has been described in FIG. 4C, but, substantially equally, the optical couplers whose principles have been described in FIGS. 2B, 2C, 3B, 3C, 4D, and 4E could be created by a self-forming optical waveguide. The action of the optical coupler of the photo view of FIG. 9A has been described, but, similarly, leakage light is partially output to an output end to which it must not be transmitted in addition to ideal propagation principles of FIGS. 1, 2A, 2B, 2C, 3A, 3B, 4A, 4B, 4C, 4D, and 4E in such a description.

In this case, in these principle views, a branch portion of a core for connecting with an external optical waveguide of an optical fiber, etc., is formed by introducing curing light by the optical fiber from positions indicated as an optical input terminal, an optical output terminal, and an optical input/output terminal. In this case, the effect of the present invention is not degraded even when a core is partially formed in a portion unnecessary as the original optical waveguide.

The transmission dissipation of the optical coupler of FIG. 3A was measured. The result is shown in Table 1.

TABLE 1

| Input | Output | Transmission Dissipation (dB) |
|---|---|---|
| In-a | Out-a | 23.9 |
|  | Out-b | 9.5 |
|  | Out-c | 11.6 |
| In-b | Out-a | 10.5 |
|  | Out-b | 23.3 |
|  | Out-c | 9.2 |
| In-c | Out-a | 11.2 |
|  | Out-b | 10.1 |
|  | Out-c | 21.8 |

As shown in Table 1, a good distribution function was possible as the original function of the optical coupler since dissipation amounts from In-a to Out-b and Out-c, from In-b to Out-c and Out-a, and from In-c to Out-a and Out-b are less than 12 dB. As dissipation amounts from In-a to Out-a, from In-b to Out-b, and from In-c to Out-c unwanted in the optical coupler exceed 21 dB, they are in a range capable of being processed as noise.

Figure 10:
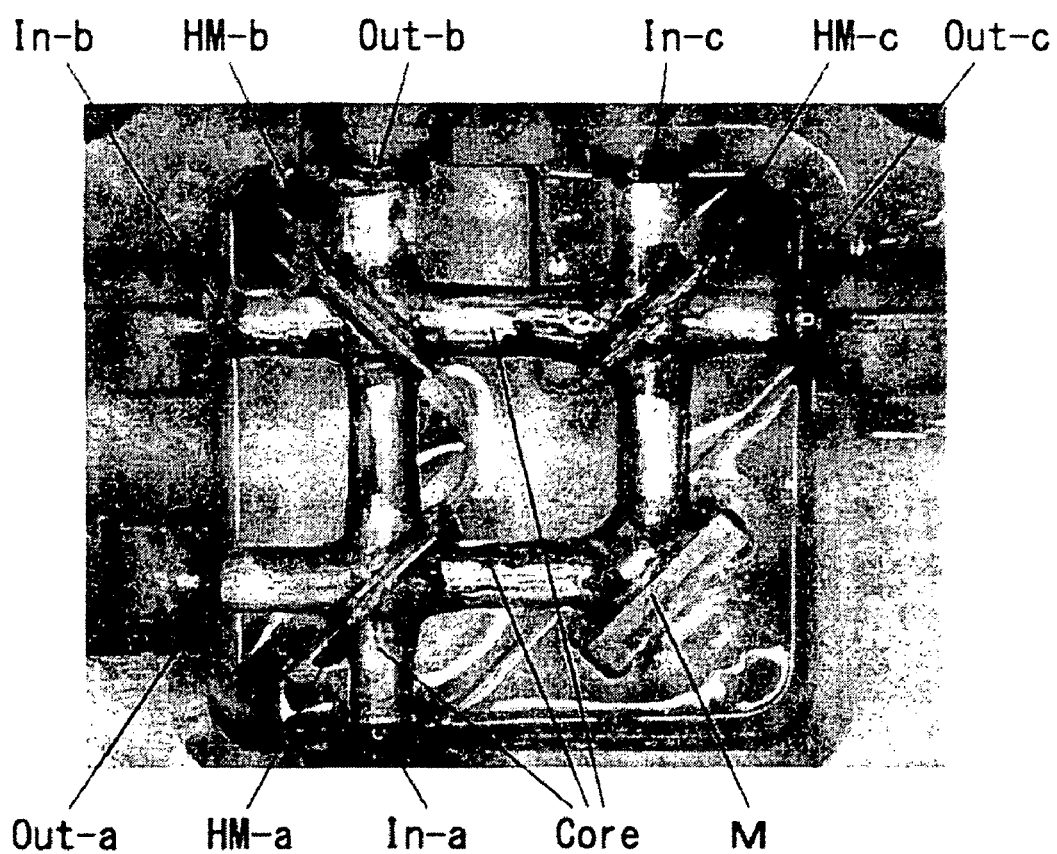

The optical coupler 100 described as an embodiment of the present invention in FIGS. 5A, 6D, 6E, and 6F was formed. FIG. 10 is a photo view illustrating the optical coupler 100. In the optical coupler 100 of FIG. 10, the optical waveguide connecting the three optical input terminals In-a, In-b, and In-c, the three optical output terminals Out-a, Out-b, and Out-c, the half mirrors HM-a, HM-b, and HM-c, and the perfect reflection mirror M was formed according to the methods of Patent Documents 1 to 4 and another known method by filling a non-curing liquefied photo-curable resin, after placing the half mirrors HM-a, HM-b, and HM-c and the perfect reflection mirror M in the housing, and introducing curing light of a wavelength to cure the photo-curable resin from the three optical input terminals In-a, In-b, and In-c and the three optical output terminals Out-a, Out-b, and Out-c.

The core of the optical fiber is directly connected to each optical input terminal and each optical output terminal of the optical waveguide core.

Design values of transmission and reflection characteristics for signal light of a wavelength 650 nm of the half mirrors HM-a, HM-b, and HM-c are shown in Table 2.

TABLE 2

|  | S-wave | | P-wave | |
| --- | --- | --- | --- | --- |
|  | refrectivity | transparency | refrectivity | transparency |
| HM-a, c | 100% | 0% | 0% | 100% |
| HM-b | 85% | 15% | 15% | 85% |

Figure 11:
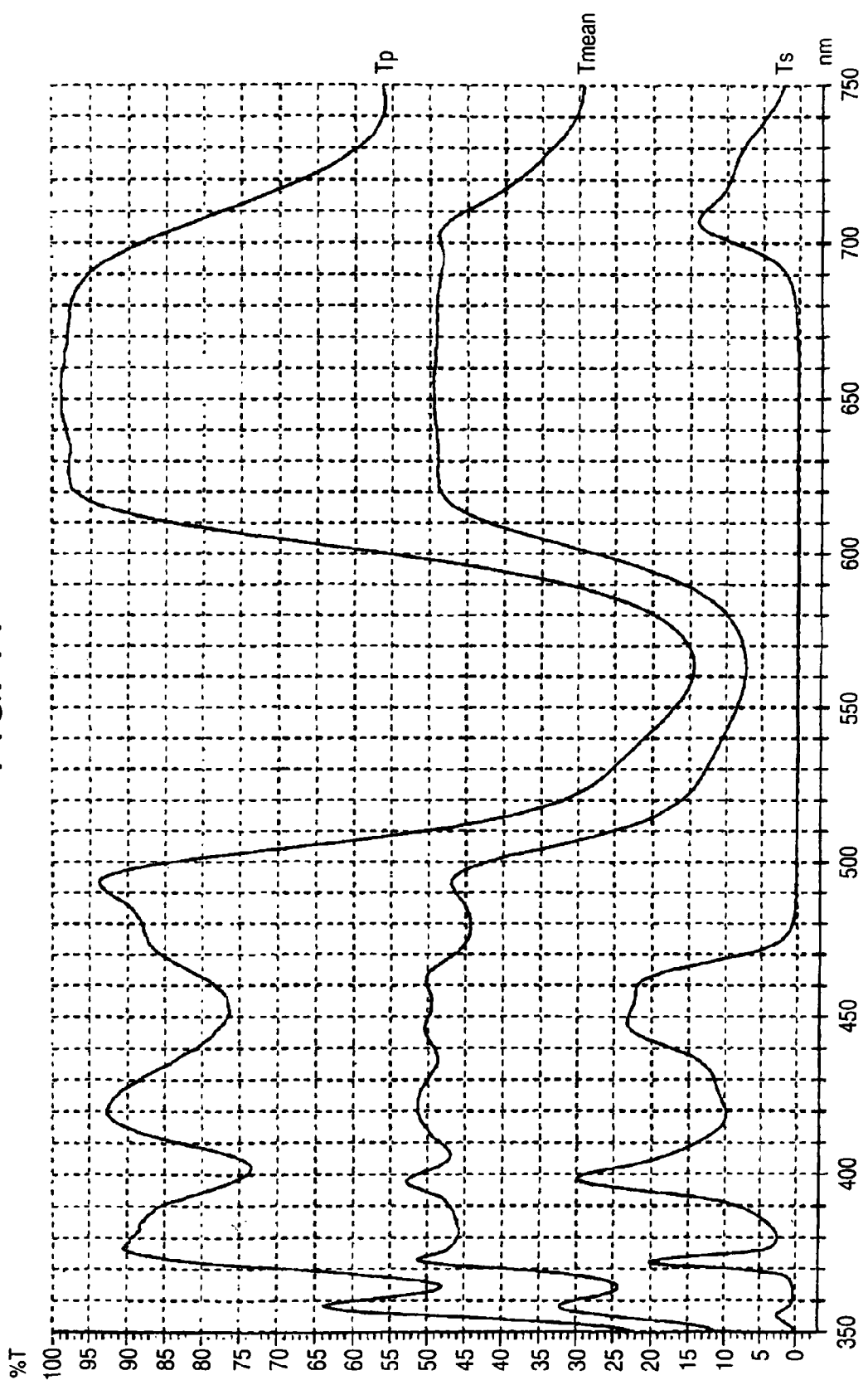
FIG. 11 is a diagram showing character of s-wave transparency and p-wave transparency around visible light for the half mirror HM-a and HM-c.
Figure 12:
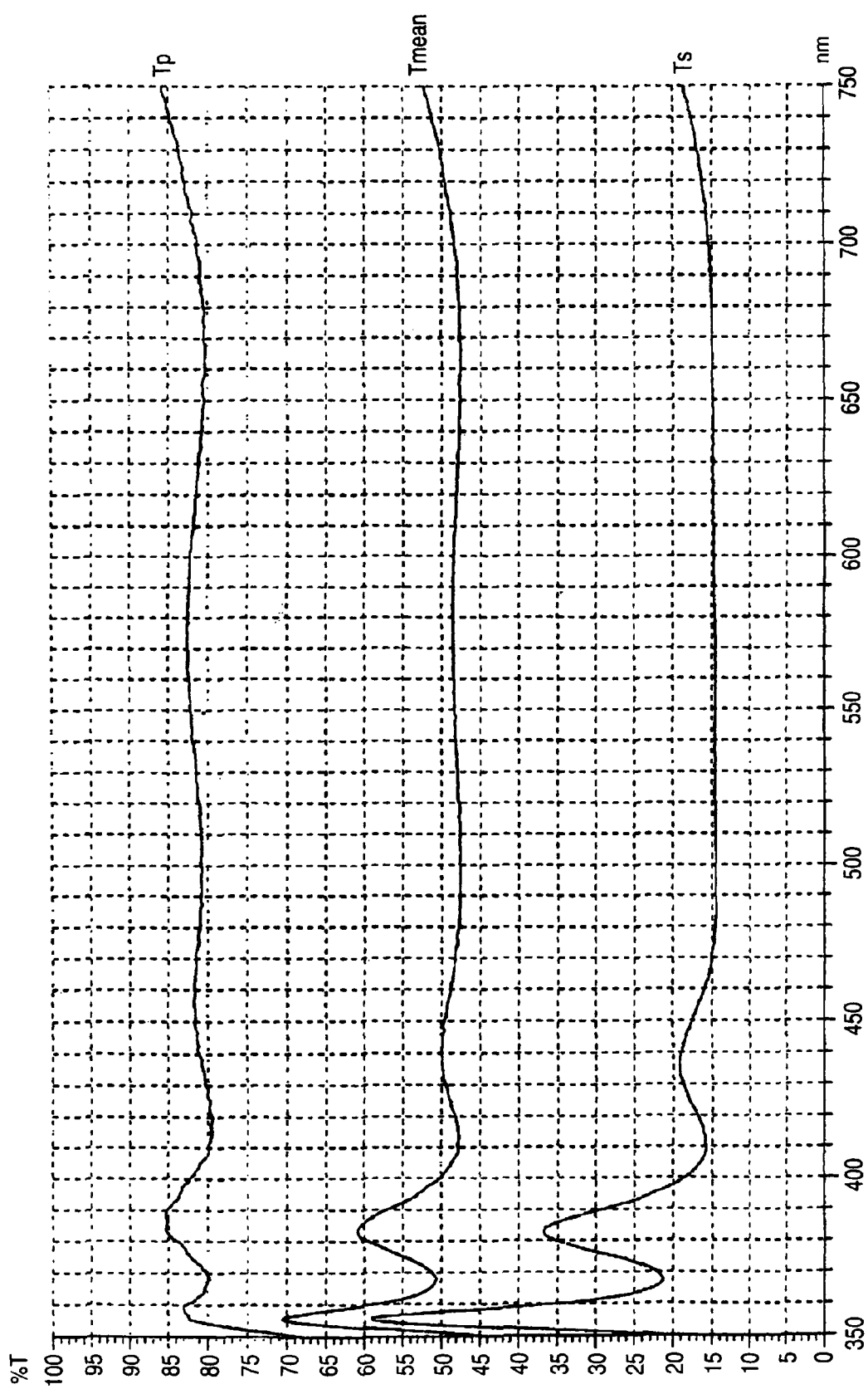
FIG. 12 is a diagram showing character of s-wave transparency and p-wave transparency around visible light for the half mirror HM-b.

Actual measurement data of the transmission characteristics of the half mirrors HM-a and HM-c manufactured on the basis of the design values of Table 2 is shown in FIG. 11 and actual measurement data of the transmission characteristics of the half mirror HM-b is shown in FIG. 12.

As shown in the characteristic view of FIG. 11, in the half mirrors HM-a and HM-c, the transmittance Tp of a p wave (an electric field in a direction within an incidence plane) of light of a wavelength 620 to 680 nm is at least 97% and the transmittance Ts of an s wave (an electric field in a direction perpendicular to the incidence plane) is less than 1%. That is, in the half mirrors HM-a and HM-c, the reflectance of the p wave (the electric field in the direction within the incidence plane) of light of the wavelength 620 to 680 nm is less than 3% and the reflectance of the s wave (the electric field in the direction perpendicular to the incidence plane) is at least 99%. In particular, in a wavelength 650 nm, the reflectance is less than 2% when the transmittance of the p wave is about 98% and the reflectance is about 100% when the transmittance of the s wave is about 0%.

In both the p and s waves, the transmittance depends upon the wavelength. The transmittance is largely different out of the above-described wavelength range. In FIG. 11, a mean transmittance Tmean for total luminous flux was shown.

As shown in the characteristic view of FIG. 12, in a wavelength range of 470 to 680 nm in the half mirror HM-b, the transmittance Tp of the p wave (the electric field in the direction within the incidence plane) is 80 to 82% and the transmittance Ts of the s wave (the electric field in the direction perpendicular to the incidence plane) is 14 to 15%. Even when the wavelength range is widened to 400 to 750 nm, the transmittance is very plateau, except for a wavelength at which each transmittance is increased by 5%.

In FIG. 12, the mean transmittance Tmean for total luminous flux was shown.

The insertion dissipation of the optical coupler 100 of the photo view of FIG. 10 was measured using the half mirrors HM-a and HM-c having the transmission characteristics of FIG. 11 and the half mirror HM-b having the transmission characteristics of FIG. 12. This is shown in Table 3. An optical coupler 900 was formed by replacing all the half mirrors HM-a, HM-b, and HM-c of the optical coupler 100 of the photo view of FIG. 10 with half mirrors in which a polarization splitting characteristic is low, reflectance is 50%, and transmittance is 50%, and, similarly, the insertion dissipation was measured. It was shown as a comparative example in Table 3.

TABLE 3

|  |  | embodiment | | comparative example | |
| --- | --- | --- | --- | --- | --- |
|  |  | Insertion dissipation | difference between ports | Insertion dissipation | difference between ports |
| In-a | Out-b | 7.4 dB | 0.2 dB | 7.7 dB | 1.9 dB |
|  | Out-c | 7.2 dB |  | 9.6 dB |  |
| In-b | Out-a | 6.6 dB | 0.9 dB | 8.0 dB | 1.3 dB |
|  | Out-c | 7.5 dB |  | 6.7 dB |  |
| In-c | Out-a | 8.0 dB | 0.2 dB | 10.0 dB | 1.6 dB |
|  | Out-b | 7.8 dB |  | 8.4 dB |  |

In the comparative example, each insertion dissipation difference between two optical output terminals to perform an output (or a difference between ports) was as large as 1.3 to 1.9 dB in any of the optical input terminals In-a, In-b, and In-c. That is, powers at different optical output terminals for the same signal were different largely. The number of paths whose insertion dissipation is at least 8 dB among six transmission paths was four. On the other hand, according to this embodiment, all insertion dissipation differences between two optical output terminals to perform an output from the optical input terminals In-a, In-b, and In-c (or all differences between ports) were less than 1 dB, thereby reducing the differences between ports. That is, powers at different optical output terminals for the same signal were not different largely. Any transmission path whose insertion dissipation exceeds 8 dB among the six transmission paths was absent and the insertion dissipation was reduced in five of the six transmission paths.

This embodiment can sufficiently reduce the insertion dissipation of each transmission path by using the half mirrors having the characteristics of FIGS. 11 and 12 and reduce each transmission dissipation difference to two optical output terminals for each optical input terminal.

As long as there is no special notice, it is preferred that a mirror in each embodiment of the present invention is a material substantially without transmission, and its transmittance does not need to be completely 0% in a desired wavelength and its reflectance does not need to be completely 100% in the wavelength.

In each embodiment of the present invention, an ideal state based on the geometric optics has been described. However, for example, since the optical waveguide is a core with a diameter using the photo-curable resin and a half mirror and/or a mirror are not a mere plane but have a thickness, diffusion light occurs, such that the diffusion light may reach a position at which the diffusion light is not supposed to arrive as noise.

To describe the principle of the present invention in each embodiment, the transmission path of the optical waveguide with the diameter is shown like a straight line, but the optical coupler related to the present invention is not surely limited to all signal paths as described using the drawings.

As described above, an optical LAN can be configured by using the optical coupler of the invention as a branching device for branching from a trunk line to each terminal.

The optical coupler of the present invention can form a branch by insertion into a main line of an optical communication line and is useful in a two-line bidirectional optical LAN.

What is claimed is:
1. A light coupler, comprising:
a plurality of light input terminals;
a plurality of light output terminals;
a plurality of half mirrors; and an optical wave guide connecting the plurality of the light input terminals, the plurality of the light output terminals, and the plurality of the half mirrors, and having a kinked line shape, wherein each of the plurality of half mirrors is placed at a respective corner of the kinked line shape, wherein the optical wave guide includes a polygon network, wherein each of the plurality of the half mirrors is placed at a respective corner of the polygon network, wherein for a number of the plurality of the input terminals Ni, a number of the plurality of the output terminals No, and a number of the plurality of the half mirrors N, Ni, No, and N satisfy following relations:

$Ni \leq N$ and $No \leq N$, wherein the polygon network comprises N corners, wherein the optical wave guide comprises an optical reactive resin;

wherein the plurality of the half mirrors comprises a first half mirror, a second half mirror and a third half mirror, wherein a first optical path length between the first and the third half mirror is longer than a second optical path length between the first and the second half mirror, and a third optical path length between the second and the third half mirror, and wherein the second half mirror has a transparency for P-wave lower than 90% and a reflectivity for S-wave lower than 90%.

2. The light coupler according to claim 1, wherein at least one of the plurality of the half mirrors is perpendicular to a bisector of the respective corner of the polygon network.

3. The light coupler according to claim 2, wherein Ni=3, No=3, and N=3.

4. The light coupler according to claim 1, wherein, at least one of the plurality of the half mirrors is on a bisector of the respective corner of the polygon network and perpendicular to a surface defined by the respective corner.

5. The light coupler according to claim 4, wherein Ni=3, No=3, and N=3.

6. The light coupler according to claim 1, wherein at least one of the plurality of the light input terminals is placed on a first extension line which is an extension of a first side forming a respective corner, and wherein at least one of the plurality of the light output terminal is placed on a second extension line which is an extension of a second side forming the respective corner.

7. The light coupler according to claim 1, wherein at least one of the input terminals and a respective one of the output terminals are combined into an input and output terminal.

8. The light coupler according to claim 1, further comprising a mirror placed on a respective corner of the polygon network.

9. The light coupler according to claim 8, wherein the mirror is perpendicular to a bisector of the respective corner on which the mirror is mounted.

10. The light coupler according to eclaim 8, wherein for a number of the plurality of the input terminals Ni, a number of the plurality of the output terminals No, a number of the plurality of the half mirrors N, and a number of the mirrors Nm, Ni, No, N, and Nm satisfy following relations:

$Ni \leq N$ and $No \leq N$, and wherein the polygon network comprises N+Nm corners.

11. The light coupler according to claim 10, wherein Ni+No=6, N=3, and Nm=1.

12. The light coupler according to claim 11, wherein a signal input from a first input terminal of the plurality of the first input terminal is output from the plurality of the output terminals except for an output terminal respective to the first input terminal as a pair.

13. The light coupler according to claim 10, wherein Ni=3, No=3, N=3, and Nm=1.

14. The light coupler according to claim 10, wherein at least one of the plurality of the light input terminal is placed on a first extension line which is an extension of a first side forming the respective corner, and wherein at least one of the plurality of the light output terminal is placed on a second extension line which is an extension of a second side forming the respective corner.

15. The light coupler according to claim 8, wherein at least one of the plurality of the half mirrors is perpendicular to a bisector of a respective corner of the polygon network where the at least one of the plurality of the half mirror is placed.

16. The light coupler according to claim 8, wherein at least one of the plurality of the half mirrors is on a bisector of a respective corner of the polygon network where one of the plurality of the half mirror is placed and perpendicular to a surface defined by a respective corner at which the one of the plurality of the half mirror is placed.

17. The light coupler according to claim 8, wherein at least one of the input terminals and a respective one of the output terminals are combined into an input and output terminal.

18. The light coupler according to claim 1, wherein an optical axis of the optical wave guide is located on a plane.

19. The light coupler according to claim 18 wherein the plurality of the half mirror is perpendicular to the plane.

20. The light coupler according to claim 19, wherein Ni=3, No=3 and N=3.

21. The light coupler according to claim 20, wherein at least two of the plurality of the half mirrors have a transparency for P-wave equal to or higher than, 90% and a reflectivity for S-wave equal to or higher than 90%, and one of the plurality of the half mirrors has a transparency for P-wave equal to or higher than 60% and a reflectivity for S-wave equal to or higher than 60%.

22. The light coupler according to claim 21, wherein at least two of the plurality of the half mirrors have a transparency for P-wave equal to or higher than 95% and a reflectivity for S-wave equal to or higher than 95%.

23. A method of manufacturing the light coupler according to claim 21, said method comprising:
arranging the plurality of the input terminals, the plurality of the output terminals, and the plurality of the half mirrors on a housing;
filling the housing with the optical reactive resin in a liquid state;
introducing a light to react with and to harden the optical reactive resin to form the optical wave guide.

24. The light coupler according to claim 1, wherein a mirror is placed between the first half mirror and the second half mirror and at a respective corner of the polygon network.

25. The light coupler according to claim 24, wherein the minor substantially has a perfect reflectivity.

26. The light coupler according to claim 24, wherein the optical wave guide has a rectangular guide shape,
wherein, at least one of the plurality of the light input terminal is placed on a first extension line which is an extension of a first side forming the respective corner, and
wherein at least one of the plurality of the light output terminal is placed on a second extension line which is an extension of a second side forming the respective corner.

27. The light coupler according to claim 26, wherein each of the plurality of the half mirrors is on a bisector of the respective corner of the polygon network and the mirror is perpendicular to a bisector of the respective corner of the polygon network.

28. A method for manufacturing the light coupler according to claim 1, said method comprising:
    arranging the plurality of the input terminals, the plurality of the output terminals, and the plurality of the half mirrors on a housing;
    filling the housing with an optical reactive resin in a liquid state; and
    introducing a light to react with and to harden the optical reactive resin to form the optical wave guide.

29. The method according to claim 28, wherein the light is introduced to the optical reactive resin through at least two of the plurality of the light input terminals.

30. The method according to claim 28, wherein the light is introduced along a side of the polygon network.

31. The method according to claim 28, wherein the light is introduced to the optical reactive resin through all of the plurality of the light input terminals.

32. A method of manufacturing the light coupler according to claim 1, said method comprising:
    arranging the plurality of the input terminals, the plurality of the output terminals, and the plurality of the half mirrors on a housing;
    filling the housing with the optical reactive resin in a liquid state;
    introducing a light to react with and to harden the optical reactive resin to form the optical wave guide.

* * * * *